(12) United States Patent
Endo et al.

(10) Patent No.: US 12,464,210 B2
(45) Date of Patent: Nov. 4, 2025

(54) IMAGE CAPTURING APPARATUS CAPABLE OF QUICKLY COOLING IMAGE SENSOR

(71) Applicant: CANON KABUSHIKI KAISHA, Tokyo (JP)

(72) Inventors: Yosaku Endo, Kanagawa (JP); Hayato Mano, Tokyo (JP); Masato Yokosawa, Tokyo (JP); Yoshinobu Shibayama, Kanagawa (JP); Kenji Yamagata, Kanagawa (JP); Yuko Teruya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 18/302,947

(22) Filed: Apr. 19, 2023

(65) Prior Publication Data

US 2023/0353850 A1    Nov. 2, 2023

(30) Foreign Application Priority Data

Apr. 28, 2022 (JP) .................................. 2022-075153

(51) Int. Cl.
 *H04N 23/52* (2023.01)
 *H04N 23/54* (2023.01)
 *H04N 23/68* (2023.01)

(52) U.S. Cl.
 CPC .............. *H04N 23/52* (2023.01); *H04N 23/54* (2023.01); *H04N 23/687* (2023.01)

(58) Field of Classification Search
 CPC ........ H04N 23/51; H04N 23/52; H04N 23/54; H04N 23/687
 See application file for complete search history.

(56) References Cited

U.S. PATENT DOCUMENTS

| 2008/0055420 | A1* | 3/2008 | Orihashi | H04N 23/687 348/208.4 |
| 2015/0070557 | A1* | 3/2015 | Petty | G03B 17/55 348/335 |
| 2019/0154949 | A1* | 5/2019 | Hosoe | G05D 23/1919 |
| 2021/0055512 | A1* | 2/2021 | Yamamoto | H04N 23/52 |

(Continued)

FOREIGN PATENT DOCUMENTS

| JP | 2009-071516 A | 4/2009 |
| JP | 5631116 B2 | 11/2014 |

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

An image capturing apparatus includes an image sensor unit including an image sensor board on which an image sensor is mounted, a first drive mechanism that drives the image sensor unit in a first direction orthogonal to an optical axis of the image sensor, a second drive mechanism that drives the unit in a second direction orthogonal to the optical axis and different from the first direction, and a first duct disposed on an opposite side of the board to a surface on which the sensor is mounted, in a state opposed to the board, to allow cooling air to pass therethrough. The first duct has an air suction port and an air discharge port. When viewed from the optical axis direction, the first drive mechanism, the second drive mechanism, the air suction port, and the air discharge port do not overlap around the image sensor.

29 Claims, 36 Drawing Sheets

(56) References Cited

U.S. PATENT DOCUMENTS

| | | | |
|---|---|---|---|
| 2021/0055631 A1* | 2/2021 | Mano | H05K 7/20418 |
| 2021/0160411 A1* | 5/2021 | Yamagata | G03B 17/55 |
| 2021/0368082 A1* | 11/2021 | Solar | H04N 23/51 |
| 2022/0294956 A1* | 9/2022 | Tamura | H04N 23/53 |
| 2022/0294957 A1* | 9/2022 | Iwasaki | H04N 23/68 |
| 2023/0035644 A1* | 2/2023 | Kuroki | H05K 7/2039 |
| 2023/0328347 A1* | 10/2023 | Oyama | H04N 23/54 |
| | | | 348/208.7 |
| 2023/0379561 A1* | 11/2023 | Nakamura | H04N 23/52 |
| 2023/0396863 A1* | 12/2023 | Abe | H04N 23/51 |

* cited by examiner

IMAGE CAPTURING APPARATUS CAPABLE OF QUICKLY COOLING IMAGE SENSOR

BACKGROUND OF THE INVENTION

Field of the Invention

The present invention relates to an image capturing apparatus that is capable of quickly cooling an image sensor.

Description of the Related Art

In recent image capturing apparatuses, image quality of a recorded image has been improved e.g. by achieving a higher resolution and a higher frame rate. In such an image capturing apparatus, a signal processing load and power consumption, caused when an image is recorded, tend to increase, and as a result, the amount of heat generated in electronic components, such as an image capturing section and a data recording section, is markedly increased. The electronic components incorporated in the image capturing apparatus may be lowered in performance when used at a high-temperature, and hence it is necessary to cool these electronic components. An image capturing apparatus described in Japanese Patent No. 5631116 includes an image sensor and heat dissipation components and is configured to cool the image sensor by performing forced air-cooling for the heat dissipation components. An image capturing apparatus described in Japanese Laid-Open Patent Publication (Kokai) No. 2009-71516 is configured to mount a cooling device on the outside of the body of the image capturing apparatus so as to perform forced air-cooling for the image sensor. Further, an image capturing apparatus is known which is equipped with an image stabilization function of detecting a vibration applied from the outside and canceling the vibration based on a result of the detection. With this image stabilization function, it is possible to record a high-quality image.

However, in the image capturing apparatus described in Japanese Patent No. 5631116, an area where the heat dissipation components are cooled is a limited partial area of a casing, and hence it may be difficult to sufficiently cool the image sensor. Further, in the image capturing apparatus described in Japanese Laid-Open Patent Publication (Kokai) No. 2009-71516, since the cooling device is mounted, this undesirably increases the size of the image capturing apparatus.

SUMMARY OF THE INVENTION

The present invention provides an image capturing apparatus that can arrange portions capable of exhibiting an image stabilization function for an image capturing section, while achieving size reduction, thereby making it possible to quickly cool an image sensor.

In a first aspect of the present invention, there is provided an image capturing apparatus including an image sensor unit that includes an image sensor board on which an image sensor is mounted, a first drive mechanism that drives the image sensor unit in a first direction orthogonal to an optical axis of the image sensor, a second drive mechanism that drives the image sensor unit in a second direction which is orthogonal to the optical axis and different from the first direction, and a unit cooling duct disposed on an opposite side of the image sensor board to a surface on which the image sensor is mounted, such that the unit cooling duct is opposed to the image sensor board, so as to allow air for cooling the image sensor unit to pass therethrough, wherein the unit cooling duct has an air suction port for suctioning the air and an air discharge port for discharging the air, and wherein when viewed from the optical axis direction, the first drive mechanism, the second drive mechanism, the air suction port, and the air discharge port are in a positional relation not overlapping one another around the image sensor.

In a second aspect of the present invention, there is provided an image capturing apparatus including an image sensor unit that includes an image sensor board on which an image sensor is mounted, a first drive mechanism that drives the image sensor unit in a first direction orthogonal to an optical axis of the image sensor, a second drive mechanism that drives the image sensor unit in a second direction which is orthogonal to the optical axis and is different from the first direction, a control circuit board that controls operations of at least the first drive mechanism and the second drive mechanism, a cooling duct through which air for cooling at least one of the image sensor unit and the control circuit board passes, and a fan that forces the air to pass through the cooling duct, wherein the cooling duct has a first air flow passage positioned between the image sensor board and the control circuit board, a second air flow passage positioned between the control circuit board and the fan, and a third air flow passage that connects between the first air flow passage and the second air flow passage.

According to the present invention, it is possible to arrange portions capable of exhibiting an image stabilization function for an image capturing section while achieving size reduction, and quickly cool an image sensor.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

However, the configurations of the following embodiments are described only by way of example and are by no means intended to limit the scope of the present invention to them alone. For example, each of the components of the present invention can be replaced with a desired component capable of exhibiting the same function. Also, a desired component may be added. Further, two or more desired configurations (features) of the embodiments can be combined.

A first embodiment will be described with reference to FIGS. 1 to 15.

Figure 1A:
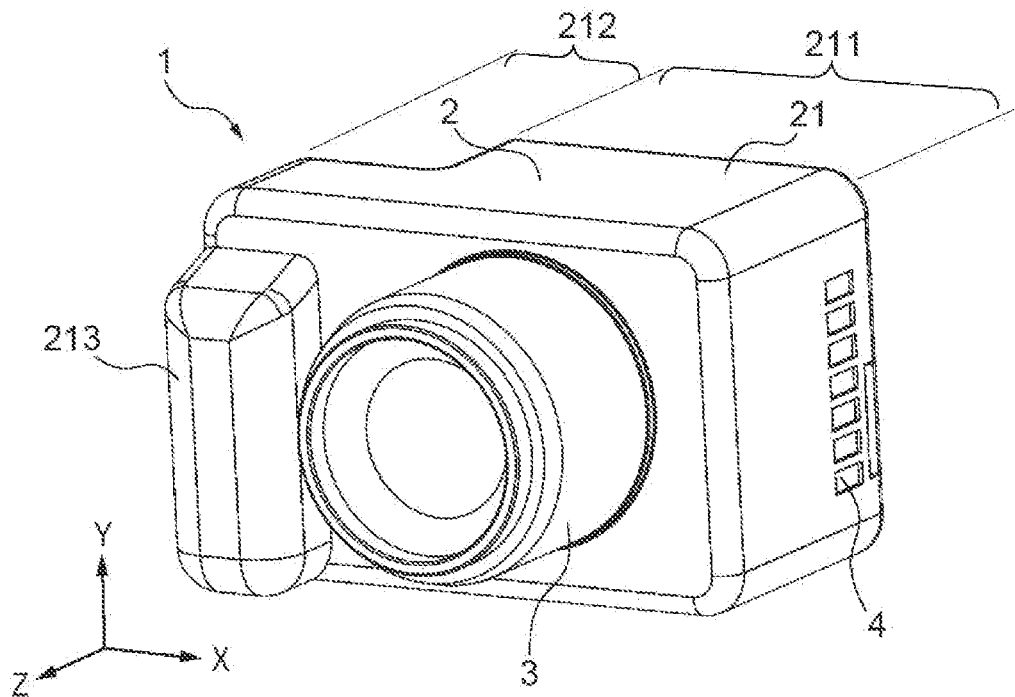
FIG. 1A is a perspective view of an image capturing apparatus according to a first embodiment, as viewed from the front.
Figure 1B:
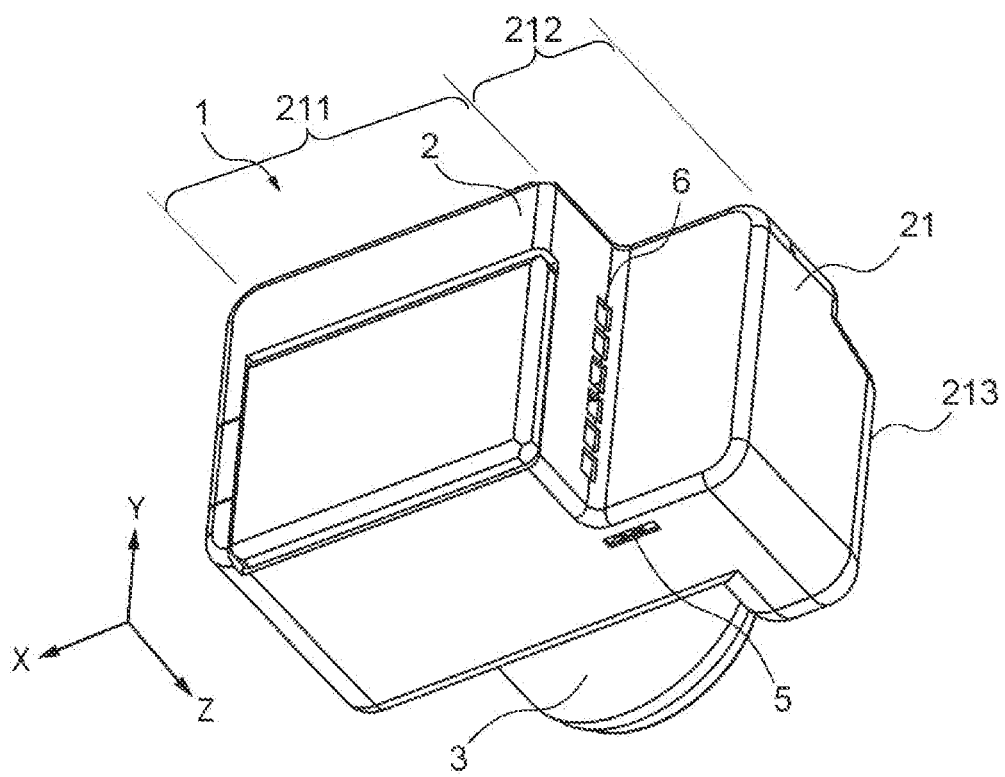
FIG. 1B is a perspective view of the image capturing apparatus, as viewed from the rear.

The configuration of an image capturing apparatus 1 according to the first embodiment will be described. FIG. 1A is a perspective view of the image capturing apparatus 1, as viewed from the front. FIG. 1B is a perspective view of the image capturing apparatus 1, as viewed from the rear. Note that for ease of explanation, an XYZ coordinate system is defined as follows: A Z-axis direction is defined as a direction of a photographing optical axis of the image capturing apparatus 1, and a direction toward a photographing object is defined as a positive direction. On a plane orthogonal to the Z-axis direction, a width direction of the image capturing apparatus 1 is defined as an X-axis direction, and a direction toward the right side of the image capturing apparatus 1, as viewed from an object side, is defined as a positive direction. Further, on the plane orthogonal to the Z-axis direction, a top-bottom direction of the image capturing apparatus 1 is defined as a Y-axis direction, and a direction toward the top is defined as a positive direction. As shown in FIGS. 1A and 1B, the image capturing apparatus 1 includes an image capturing apparatus body 2 and a lens barrel 3. The lens barrel 3 is removably mounted on a photographing object side (in a +Z direction), i.e. a front side of the image capturing apparatus body 2. The lens barrel 3 has at least one lens (not shown) accommodated and arranged therein, and is exchanged with another according to a photographing condition, on an as-needed basis. On the image capturing apparatus body 2, a casing 21 is mounted in which a control circuit board 11, an image sensor 101, and so forth, described hereinafter, are accommodated and arranged. Note that the control circuit board 11 is configured to control the overall operation of the image capturing apparatus 1. The image sensor 101 is configured to convert light incident through the lens barrel 3 to electrical signals. The casing 21 varies in thickness along the Z-axis direction and has a first part 211 which is large in thickness and a second part 212 which is small in thickness. When a user performs photographing using the image capturing apparatus 1, the user can grasp the second part 212. Further, on a front side of the second part 212, a finger-hooking part 213 on which the user can hook his/her fingers when the user grasps the second part 212 is formed such that the finger-hooking part 213 protrudes from the front side of the second part 211.

As shown in FIG. 1B, a first air inlet port 5 opens in a bottom side (in a −Y direction) of the second part 212, for sucking outside air (air) therefrom according to an operation of a cooling fan (fan) 13, described hereinafter. The number of openings formed as the first air inlet port 5 is three in the arrangement shown in FIG. 1B but is not limited to this. Similar to the first air inlet port 5, a second air inlet port 6 in a left side (in a −X direction) of the first part 211, for sucking outside air therefrom. The number of openings formed as the second air inlet port 6 is six in the arrangement shown in FIG. 1B but is not limited to this. The first air inlet port 5 and the second air inlet port 6 are both arranged at respective locations where they are prevented from being covered with a hand in a state in which the user grasps the casing 21 when performing photographing. As shown in FIG. 1A, a first air outlet port 4 opens in a right side (in a +X direction) of the first part 211, for discharging air sucked from the first air inlet port 5 and the second air inlet port 6, to the outside. The number of openings formed as the first air outlet port 4 is six in the arrangement shown in FIG. 1A but is not limited to this. The first air outlet port 4 is arranged at a location where it is prevented from being covered with a hand in a state in which the user grasps the casing 21 when performing photographing.

Figure 2A:
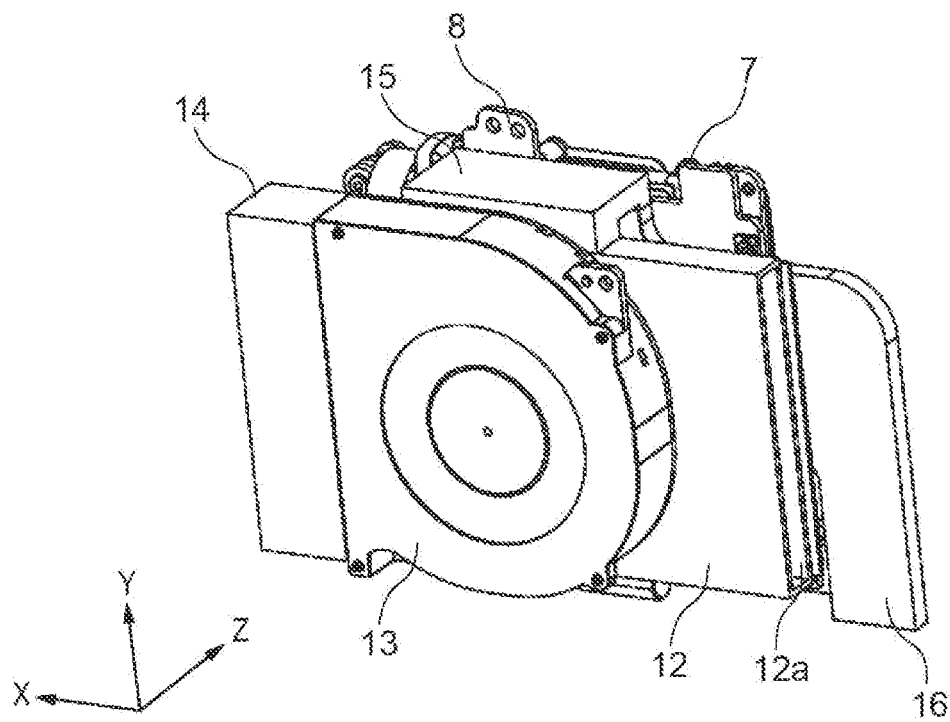
FIG. 2A is a perspective view of internal components of the image capturing apparatus, as viewed from the rear.
Figure 2B:
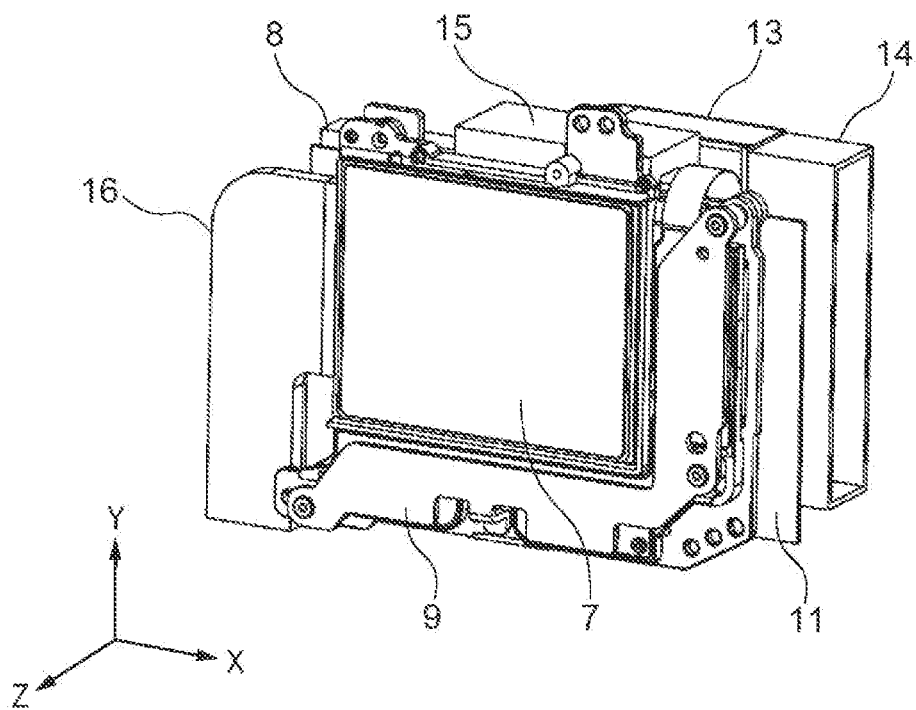
FIG. 2B is a perspective view of the internal components of the image capturing apparatus, as viewed from the front.
Figure 3A:
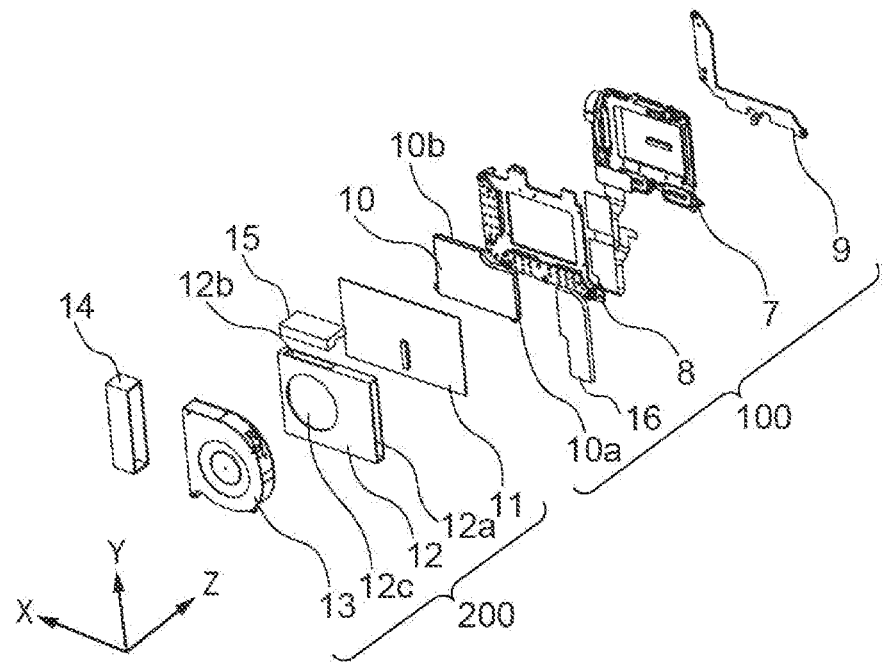
FIG. 3A is an exploded perspective view of the internal components of the image capturing apparatus, as viewed from the rear.
Figure 3B:
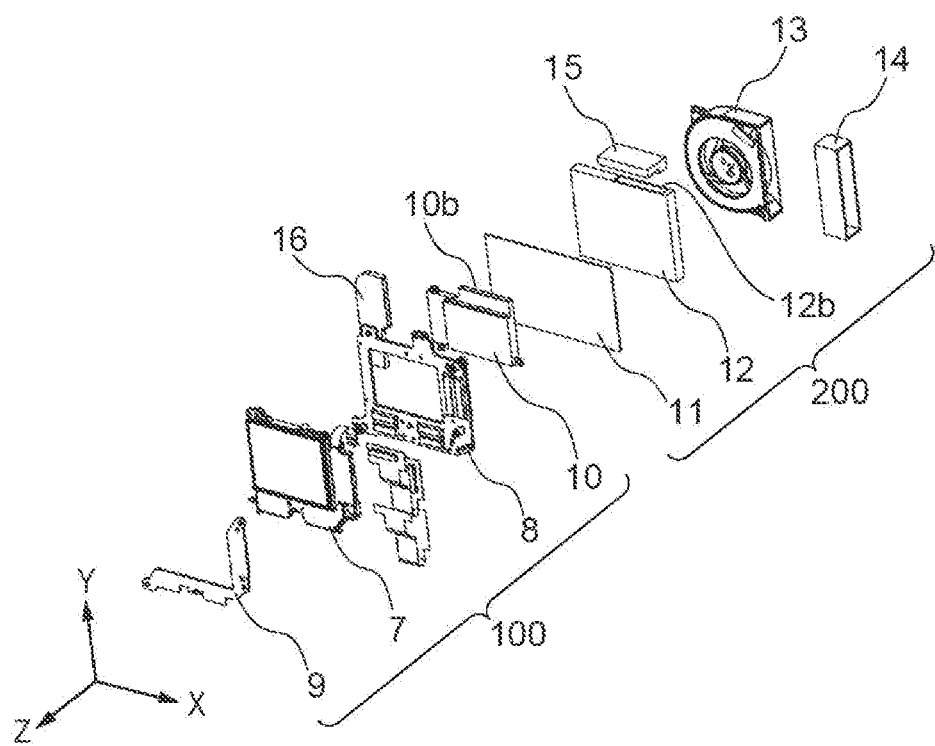
FIG. 3B is an exploded perspective view of the internal components of the image capturing apparatus, as viewed from the front.

Internal components of the image capturing apparatus 1 will be briefly described. FIG. 2A is a perspective view of the internal components of the image capturing apparatus 1, as viewed from the rear. FIG. 2B is a perspective view of the internal components of the image capturing apparatus 1, as viewed from the front. FIG. 3A is an exploded perspective view of the internal components of the image capturing apparatus 1, as viewed from the rear. FIG. 3B is an exploded perspective view of the internal components of the image capturing apparatus 1, as viewed from the front. As shown in FIGS. 2A, 2B, 3A, and 3B, the internal components of the image capturing apparatus 1 (image capturing apparatus body 2) include an image sensor unit 7, an image stabilization fixture unit 8, and a front-side sheet metal 9. Further, the internal components include a first duct (unit cooling duct) 10, the control circuit board 11, a second duct (circuit board cooling duct) 12, the cooling fan 13, an air outlet port connection section 14, a duct connection section 15, and a first air inlet port connection section 16.

As shown in FIGS. 3A and 3B, the front-side sheet metal 9, the image sensor unit 7, the image stabilization fixture unit 8, the first duct 10, the control circuit board 11, the second duct 12, and the cooling fan 13 are arranged from the positive side to the negative side in the Z-axis direction (optical axis direction) in the mentioned order. Then, these internal components can be divided into an image capturing unit 100 and a main unit 200. The image capturing unit 100 is formed by the image sensor unit 7, the image stabilization fixture unit 8, the front-side sheet metal 9, and the first duct 10. Note that the first air inlet port connection section 16 also forms part of the image capturing unit 100. The image stabilization fixture unit 8 functions as a support member for supporting the image sensor unit 7 such that the image sensor unit 7 is movable between the image stabilization fixture unit 8 and the front-side sheet metal 9. The image sensor unit 7 moves in the X-axis direction (first direction) which is orthogonal to the Z-axis direction and in the Y-axis direction (second direction) which is orthogonal to the Z-axis direction and is different from the X-axis direction. With this movement, an image stabilization function is exhibited for the image sensor 101 (image sensor unit 7) to prevent a camera shake blur from being caused when performing photographing. The first duct 10 is disposed to be opposed to the image sensor unit 7 and can exchange heat with the image sensor unit 7. This makes it possible to cool the image sensor 101. This first duct 10 is fixed to the image stabilization fixture unit 8. With this, the first duct 10 can stably perform heat exchange with the image sensor unit 7. The main unit 200 is formed by the control circuit board 11, the second duct 12, and the cooling fan 13. Note that the air outlet port connection section 14 also forms part of the main unit 200. The second duct 12 is disposed on an opposite side of the control circuit board 11 from the image sensor unit 7, such that the second duct 12 is opposed to the control circuit board 11, and can exchange heat with the control circuit board 11. This makes it possible to cool the control circuit board 11.

The first duct 10 has a flat box shape and has a first duct air suction portion (air suction port) 10a which opens in a negative side in the X-axis direction and a first duct air discharge portion (air discharge port) 10b which opens in a positive side in the Y-axis direction. The first duct air suction portion 10a is connected to the above-mentioned first air inlet port 5 via the first air inlet port connection section 16 which has a tubular shape. With this arrangement, air is suctioned into the first duct air suction portion 10a. Then, this air passes through the first duct 10 and is discharged from the first duct air discharge portion 10b. The second duct 12 also has a flat box shape and has a second duct air suction port 12a which opens in a negative side in the X-axis direction and a second duct air inlet port 12b which opens in a positive side in the Y-axis direction. The second duct air suction port 12a is connected to the above-mentioned second air inlet port 6. With this arrangement, air is suctioned into the second duct air suction port 12a. The second duct air inlet port 12b is connected to the first duct air discharge portion 10b of the first duct 10 via the duct connection section 15. With this arrangement, air discharged from the first duct air discharge portion 10b is drawn into the second duct air inlet port 12b. Further, the second duct 12 has an opening 12c opens in a negative side in the Z-axis direction. The cooling fan 13 is connected to the opening 12c. The cooling fan 13 is formed by a centrifugal fan and can discharge air drawn from the front side of the centrifugal fan in a centrifugal direction (toward the side surface).

To an exhaust side of the cooling fan 13, the air outlet port connection section 14 having a tubular shape is connected. By operating the cooling fan 13, it is possible to suction air into the first air inlet port 5 and the second air inlet port 6. The air suctioned from the first air inlet port 5 is forced to sequentially pass through the first duct 10 and the second duct 12. Further, the air suctioned from the second air inlet port 6 is forced to pass through the second duct 12. Then, the air having passed through both the ducts is discharged from the first air outlet port 4. With this flow of air, the first duct 10 promotes heat exchange with (heat dissipation from) the image sensor unit 7, and the second duct 12 promotes heat exchange with (heat dissipation from) the control circuit board 11. This makes it possible to quickly cool the image sensor 101 and the control circuit board 11. Note that a material forming the first duct 10 and the second duct 12 is not particularly limited, and it is preferable to use a material having a relatively high heat conductivity, such as aluminum.

Figure 4A:
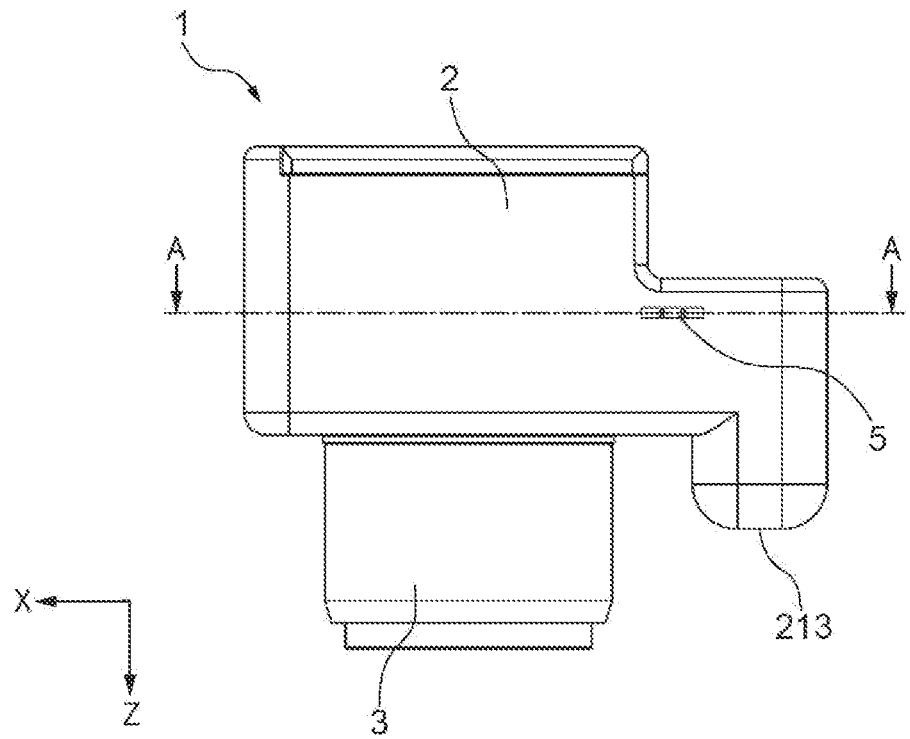
FIG. 4A is a bottom view of the image capturing apparatus.
Figure 4B:
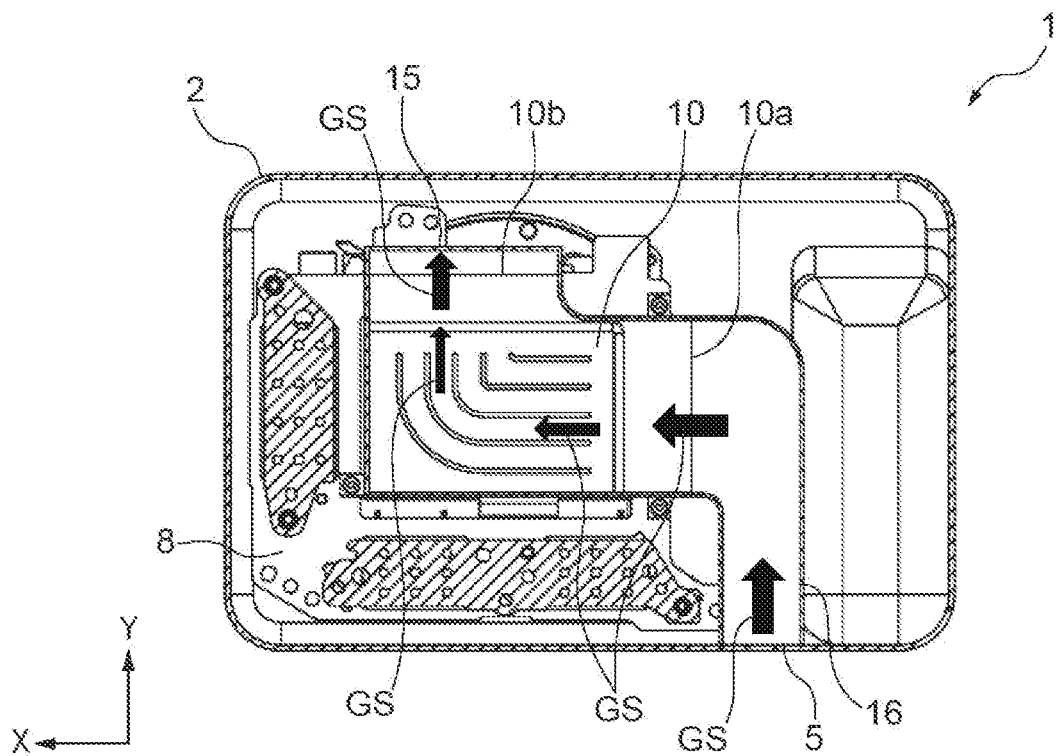
FIG. 4B is a cross-sectional view taken along A-A in FIG. 4A.
Figure 5A:
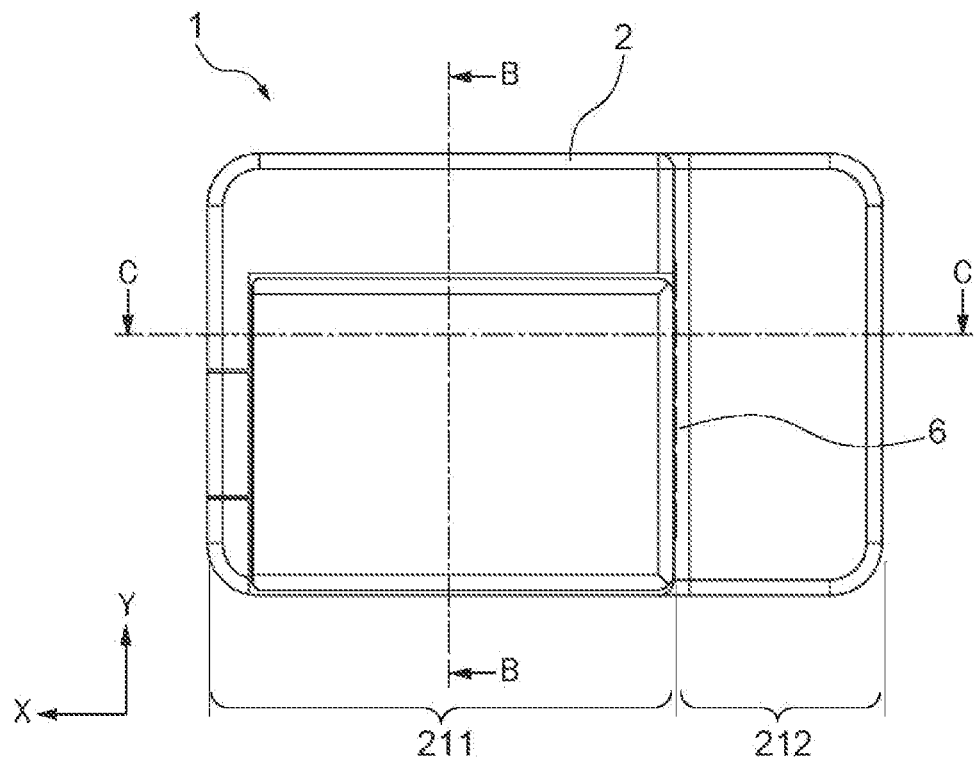
FIG. 5A is a rear view of the image capturing apparatus.
Figure 5B:
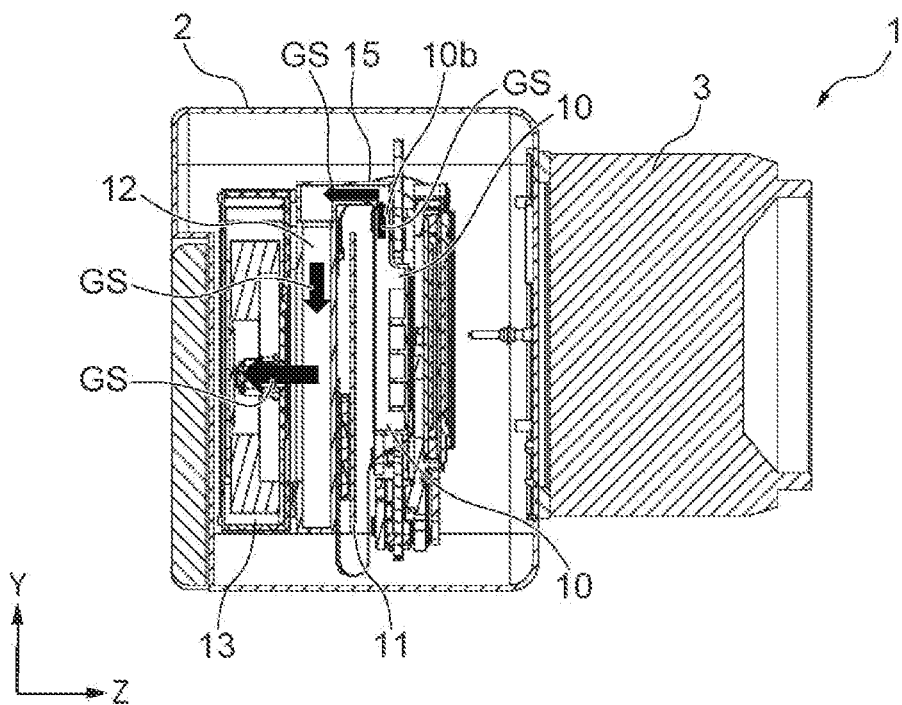
FIG. 5B is a cross-sectional view taken along B-B in FIG. 5A.
Figure 5C:
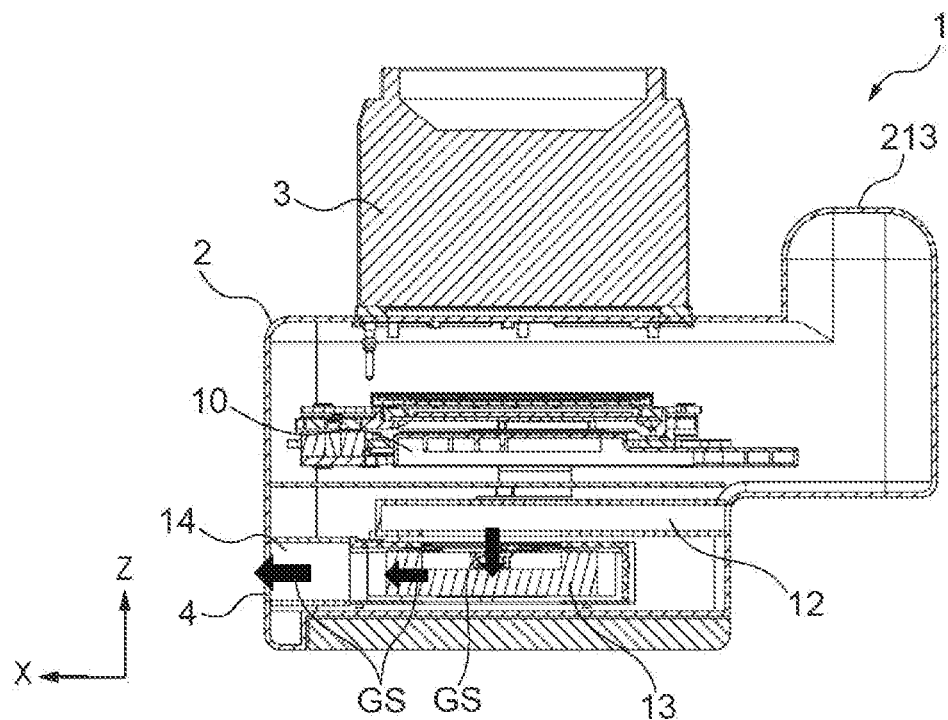
FIG. 5C is a cross-sectional view taken along C-C in FIG. 5A.
Figure 5D:
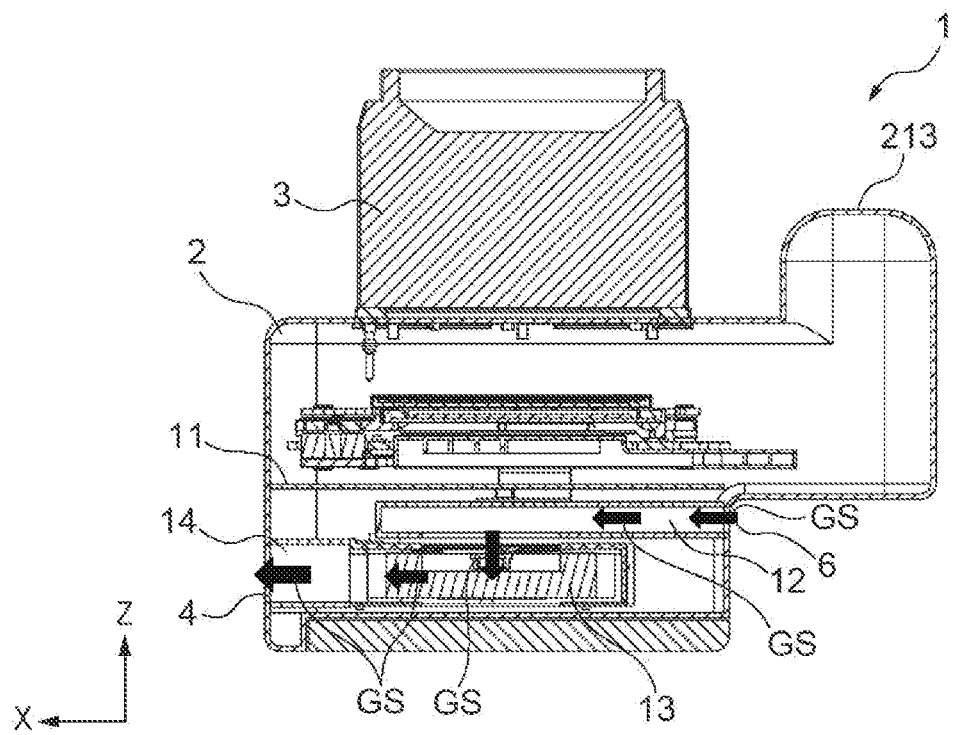
FIG. 5D is a cross-sectional view taken along C-C in FIG. 5A.

A heat dissipation structure of the image capturing apparatus 1 will be described. FIG. 4A is a bottom view of the image capturing apparatus 1. FIG. 4B is a cross-sectional view taken along A-A in FIG. 4A. FIG. 5A is a rear view of the image capturing apparatus 1. FIG. 5B is a cross-sectional view taken along B-B in FIG. 5A. FIGS. 5C and 5D are cross-sectional views taken along C-C in FIG. 5A.

In the image sensor unit 7, the image sensor 101 generates heat by being energized e.g. for performing photographing. This heat generated by the image sensor 101 is transferred to the first duct 10 having high heat conductivity. As a result, the first duct 10 becomes high in temperature. Details of heat transfer from the image sensor 101 to the first duct 10 will be described hereinafter. Further, as shown in FIG. 4B, air denoted by GS sequentially passes through the first air inlet port 5 and the first air inlet port connection section 16 in accordance with the operation of the cooling fan 13. Then, the air GS flows into the first duct 10 connected to the first air inlet port connection section 16 and passes through the first duct 10. With this, the air GS is subjected to heat exchange with the first duct 10 which is high in temperature, i.e. takes heat from the first duct 10 and becomes high in temperature. Then, after passing through the first duct 10, as shown in FIG. 5B, the air GS which has become high in temperature flows into the second duct 12 via the duct connection section 15 and passes through the second duct 12. After that, the air GS is drawn by the cooling fan 13. Then, as shown in FIG. 5C, the air GS passes through the air outlet port connection section 14 and is discharged from the first air outlet port 4 to the outside. With this forced air cooling mechanism, it is possible to quickly dissipate heat of the image sensor 101 as a main heat generation source of the image capturing apparatus body 2 to the outside of the image capturing apparatus 1.

Further, the control circuit board 11 also generates heat by being energized e.g. for performing photographing. This heat generated in the control circuit board 11 is transferred to the second duct 12 having high heat conductivity. As a result, the second duct 12 becomes high in temperature. The air GS is suctioned from the second air inlet port 6 in accordance with the operation of the cooling fan 13 as shown in FIG. 5D. Then, the air GS flows into the second duct 12 connected to the second air inlet port 6 and passes through the second duct 12. With this, the air GS exchanges heat with the second duct 12 which is high in temperature.

Then, after passing through the second duct 12, the air GS which is high in temperature is drawn by the cooling fan 13. After that, the air GS passes through the air outlet port connection section 14 and is discharged from the first air outlet port 4 to the outside. With this forced air cooling mechanism, it is possible to quickly dissipate heat of the control circuit board 11 as a main heat generation source of the image capturing apparatus body 2, similarly to the image sensor 101, to the outside of the image capturing apparatus 1.

Figure 6A:
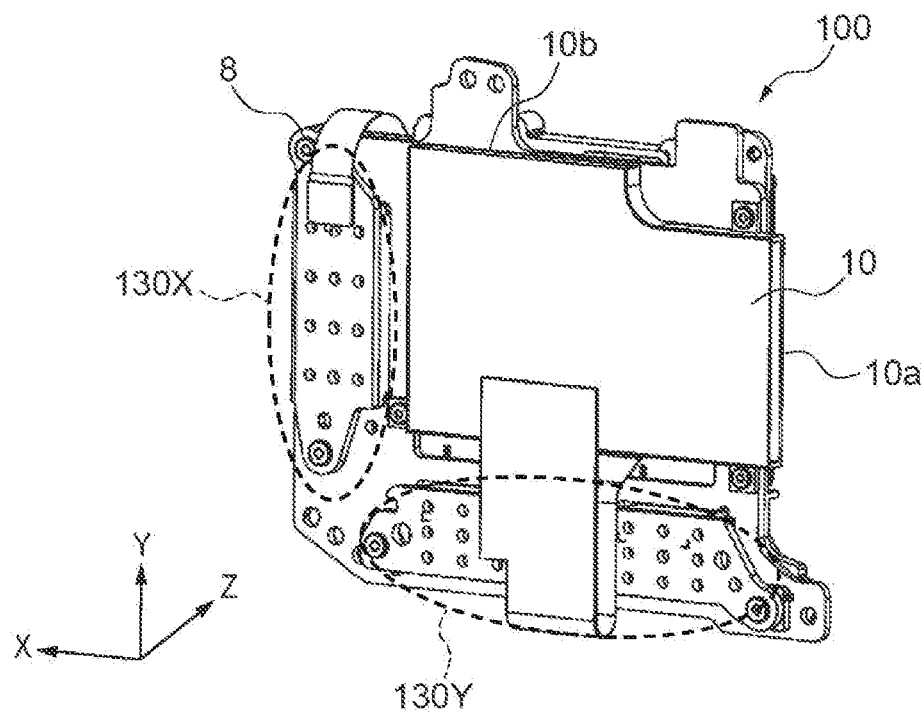
FIG. 6A is a perspective view of an image capturing unit, as viewed from the rear.
Figure 6B:
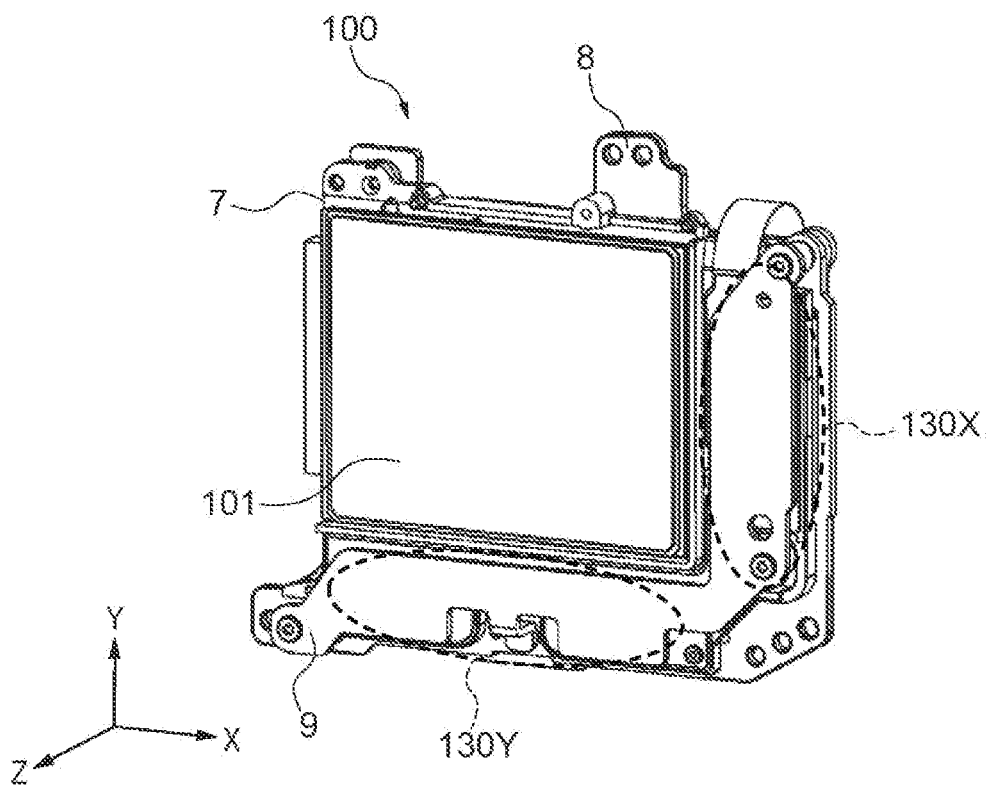
FIG. 6B is a perspective view of the image capturing unit, as viewed from the front.
Figure 7A:
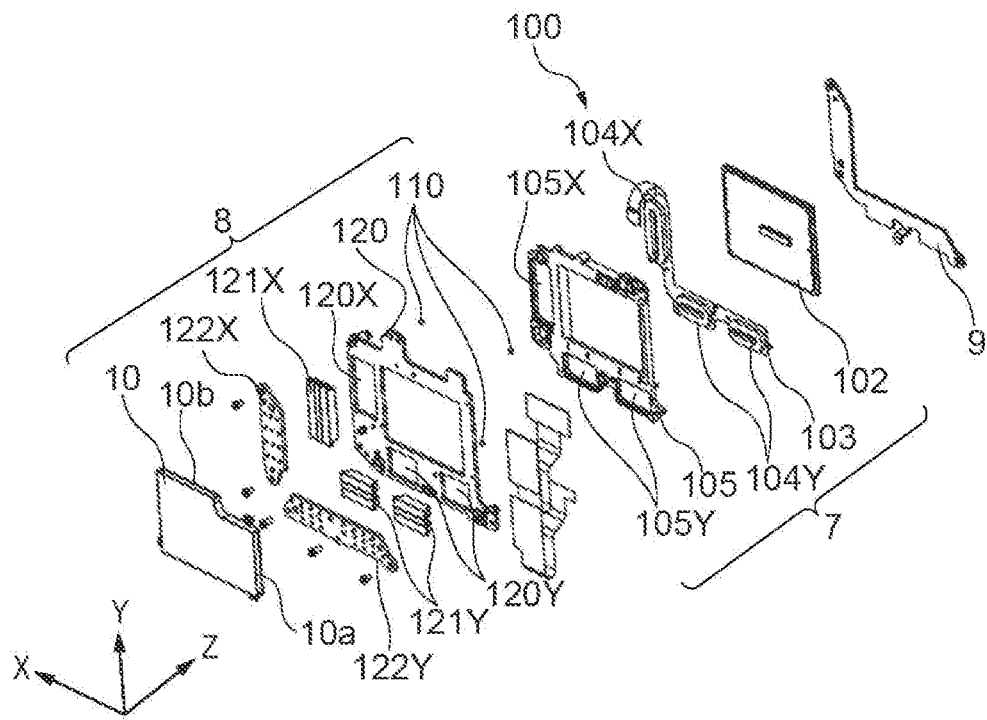
FIG. 7A is an exploded perspective view of the image capturing unit, as viewed from the rear.
Figure 7B:
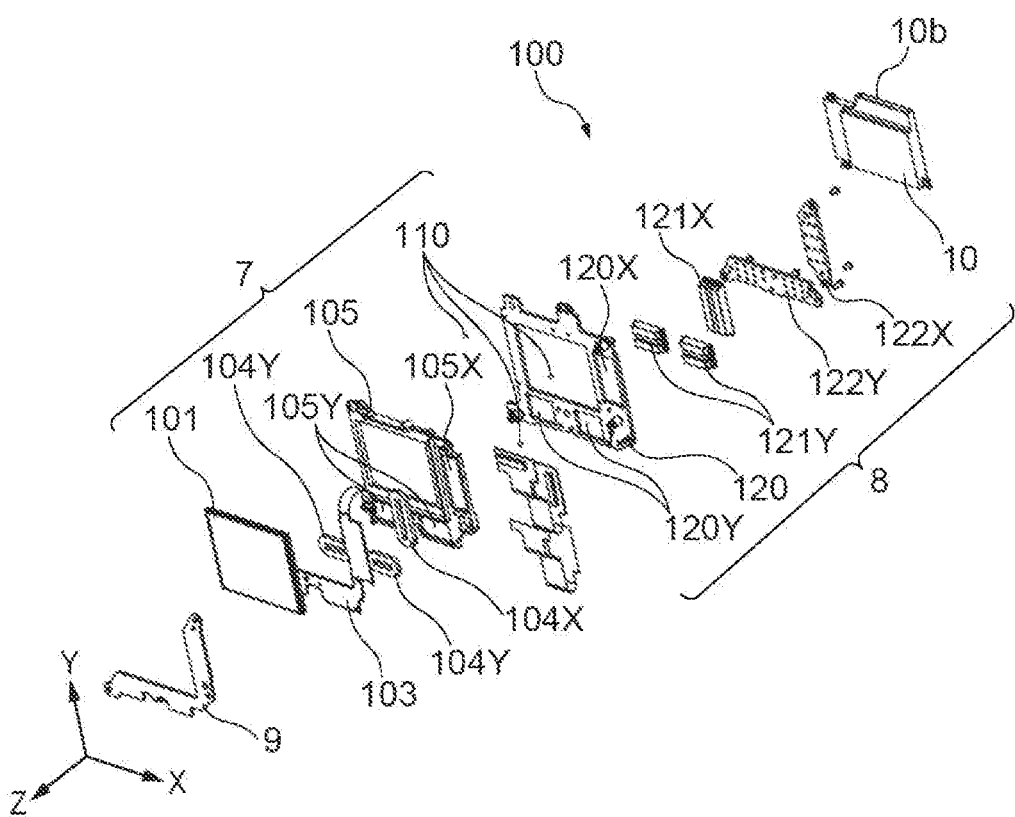
FIG. 7B is an exploded perspective view of the image capturing unit, as viewed from the front.

An image stabilization structure of the image capturing unit 100 will be described. FIG. 6A is a perspective view of the image capturing unit 100, as viewed from the rear. FIG. 6B is a perspective view of the image capturing unit 100, as viewed from the front. FIG. 7A is an exploded perspective view of the image capturing unit 100, as viewed from the rear. FIG. 7B is an exploded perspective view of the image capturing unit 100, as viewed from the front. As shown in FIGS. 6A, 6B, 7A, and 7B, the image capturing unit 100 includes the image sensor unit 7, the image stabilization fixture unit 8, the front-side sheet metal 9, and the first duct 10. As shown in FIGS. 7A and 7B, the image sensor unit 7 is formed by the image sensor 101, an image sensor board 102, an image capturing unit-driving flexible circuit board 103, a first coil 104X, two second coils 104Y, and an image sensor-holding member (sensor holding member) 105. The image stabilization fixture unit 8 is formed by a rear-side fixing plate 120, a first permanent magnet 121X, two second permanent magnets 121Y, a first rear-side sheet metal 122X, and a second rear-side sheet metal 122Y.

The image sensor 101 is mounted on the image sensor board 102. Note that although the image sensor 101 has a rectangular shape which is long in the X direction, as viewed from the Z-axis direction, in the present embodiment, this is not limitative, but for example, the image sensor 101 may have a rectangular shape which is long in the Y direction, a square shape, or a shape different from the rectangle shape. Further, the first duct 10 is arranged on a side of the image sensor board 102, opposite to a surface on which the image sensor 101 is mounted. The image sensor board 102 is fixed to the image sensor-holding member 105, which has a frame shape, e.g. by an adhesive. With this, a state in which the image sensor board 102 is held on the image sensor-holding member 105 is maintained. The image capturing unit-driving flexible circuit board 103 is communicably connected to the image sensor board 102. This image capturing unit-driving flexible circuit board 103 is fixed to the image sensor-holding member 105 e.g. by a double-sided tape or screws. The first coil 104X and the second coils 104Y are fixed to the image capturing unit-driving flexible circuit board 103 and electrically connected to the image capturing unit-driving flexible circuit board 103. The first coil 104X is disposed inside an opening 105X of the image sensor-holding member 105, and the second coils 104Y are disposed inside openings 105Y of the image sensor-holding member 105, respectively. The image sensor unit 7 is held between the image stabilization fixture unit 8 and the front-side sheet metal 9, and a plurality of ball members 110 are interposed between the image sensor unit 7 and the rear-side fixing plate 120 of the image stabilization fixture unit 8. The image sensor unit 7 can smoothly move in the X-axis direction and the Y-axis direction by rolling of the ball members 110.

The first permanent magnet 121X of the image stabilization fixture unit 8 is held inside an opening 120X of the rear-side fixing plate 120, and the second permanent magnets 121Y are held inside openings 120Y of the rear-side fixing plate 120. Further, the first permanent magnet 121X is covered with the first rear-side sheet metal 122X from a negative side in the Z-axis direction, and the second permanent magnets 121Y are collectively covered with the second rear-side sheet metal 122Y from the negative side in the Z-axis direction. The first rear-side sheet metal 122X and the second rear-side sheet metal 122Y are fixed to the rear-side fixing plate 120 with screws. Further, the first duct 10 is also fixed to the rear-side fixing plate 120 with screws. The first coil 104X and the first permanent magnet 121X are disposed to be opposed to each other in the Z-axis direction between the front-side sheet metal 9 and the first rear-side sheet metal 122X. The first coil 104X and the first permanent magnet 121X form a first drive mechanism 130X for driving the image sensor unit 7 in the X-axis direction by using a voice coil motor (VCM) system (see FIGS. 6A and 6B). In the first drive mechanism 130X, when the first coil 104X is in an energized state, a force for driving the image sensor unit 7 in the X-axis direction (Yaw direction) is generated. This makes it possible to control the position of the image sensor unit 7 in the X-axis direction. The second coils 104Y and the second permanent magnets 121Y are disposed to be opposed to each other in the Z-axis direction between the front-side sheet metal 9 and the second rear-side sheet metal 122Y. Two sets of the second coil 104Y and the second permanent magnet 121Y are disposed to form a second drive mechanism 130Y for driving the image sensor unit 7 in the Y-axis direction by using the voice coil motor (VCM) system. In the second drive mechanism 130Y, when the second coils 104Y are in an energized state, a force for driving the image sensor unit 7 in the Y-axis direction (pitch direction) and a force for driving the image sensor unit 7 in a direction of rotating about the Z-axis (roll direction) are generated depending on the direction of a current flowing through each set. This makes it possible to control the position of the image sensor unit 7 in the Y-axis direction and the position of the same about the Z-axis. With the image stabilization fixture unit 8 constructed as above, when an external force is applied to the image capturing apparatus 1, it is possible to detect an amount of a camera shake caused by the external force and drive the image sensor unit 7 so as to cancel the detected amount of the camera shake. With this, it is possible to correct a blur of a photographed image, caused by a camera shake of the image capturing apparatus 1. Note that the operations of the first drive mechanism 130X and the second drive mechanism 130Y are controlled by the control circuit board 11.

Figure 8A:
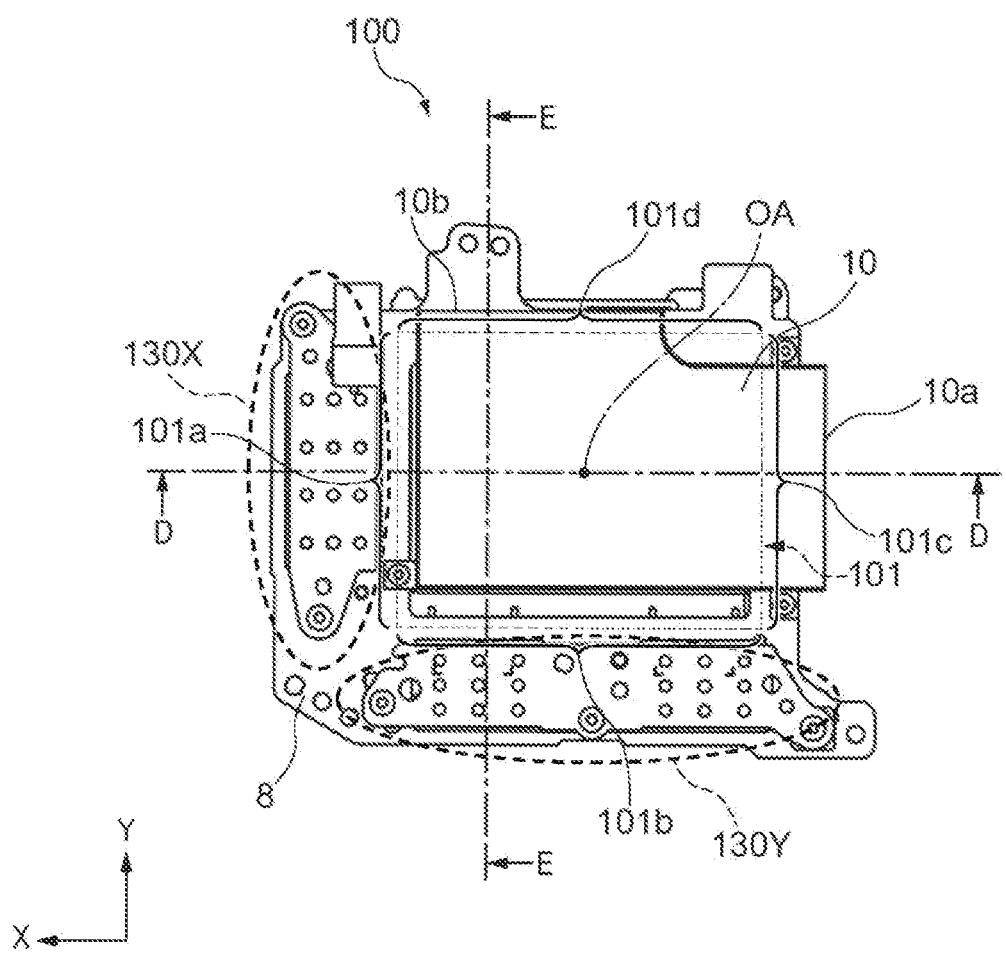
FIG. 8A is a view showing a positional relationship between the image capturing unit and a first duct, as viewed from the rear.
Figure 8B:
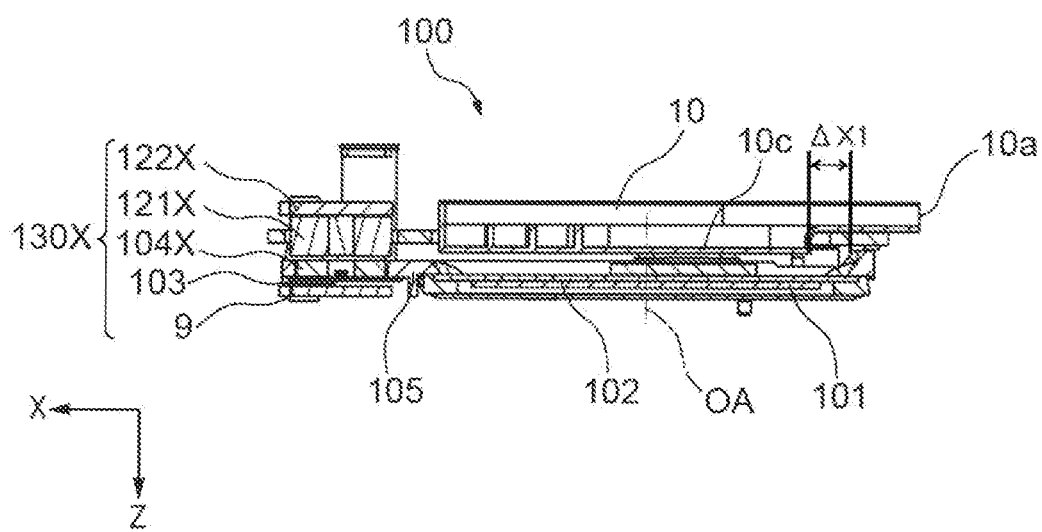
FIG. 8B is a cross-sectional view taken along D-D in FIG. 8A.
Figure 8C:
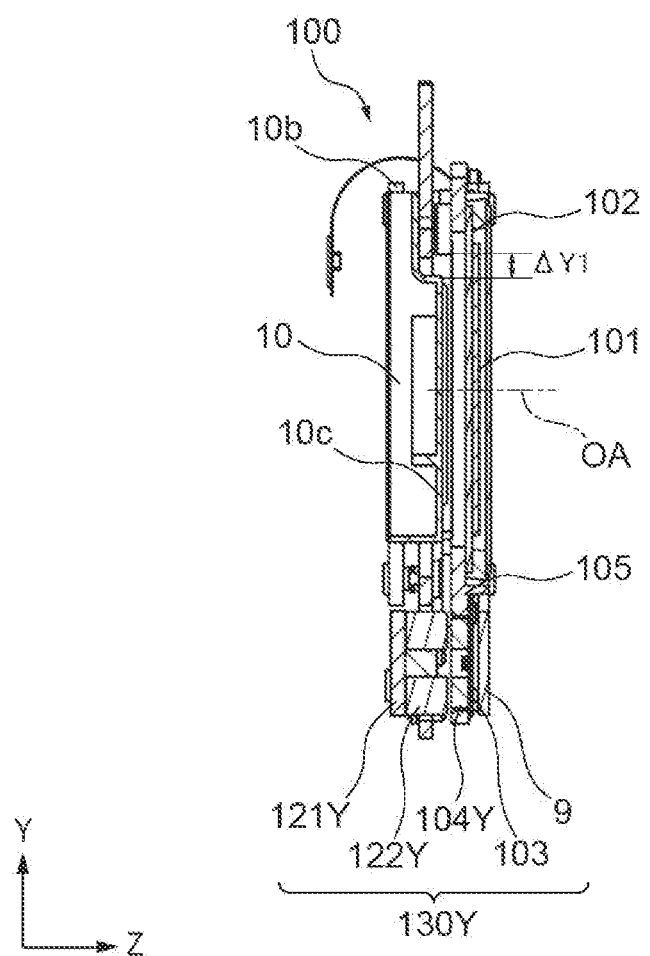
FIG. 8C is a cross-sectional view taken along E-E in FIG. 8A.

A positional relationship between the image capturing unit 100 and the first duct 10 will be described. FIG. 8A is a view showing the positional relationship between the image capturing unit 100 and the first duct 10, as viewed from the rear. FIG. 8B is a cross-sectional view taken along D-D in FIG. 8A. FIG. 8C is a cross-sectional view taken along E-E in FIG. 8A.

As shown in FIG. 8A, the first drive mechanism 130X is arranged along the Y-axis direction, and the second drive mechanism 130Y is arranged along the X-axis direction. With this arrangement, the first drive mechanism 130X and the second drive mechanism 130Y are in respective states arranged on two sides, adjacent to each other, of a rectangle of the image sensor 101, i.e. a short side 101a on a left side (+X side) and a long side 101b on a lower side (−Y side), respectively. Further, as described above, the first duct 10 has the first duct air suction portion 10a as an inlet of air and the first duct air discharge portion 10b as an outlet of air. The first duct air suction portion 10a and the first duct air discharge portion 10b are arranged on the remaining two sides, adjacent to each other, of the rectangle of the image sensor 101, which are different from the short side 101a and the long side 101b, i.e. a short side 101c on a right side and a long side 101d on an upper side, respectively. Therefore, in the present embodiment, the first drive mechanism 130X and the first duct air suction portion 10a are arranged across an optical axis OA of the image sensor 101, and the second drive mechanism 130Y and the first duct air discharge portion 10b are arranged across the optical axis OA. Thus, in the image capturing apparatus 1, the first drive mechanism 130X, the second drive mechanism 130Y, the first duct air suction portion 10a, and the first duct air discharge portion 10b are in a positional relationship in which they do not overlap one another around the image sensor 101, as viewed from the Z-axis direction. With this positional relationship, the first duct 10 is arranged such that a projected shadow thereof does not overlap the first drive mechanism 130X and the second drive mechanism 130Y but overlaps the image sensor board 102, as viewed e.g. from the rear. With this arrangement, it is possible to effectively use a space behind the image sensor unit 7 as the space for arranging the first duct 10 and thereby reduce the size of the image capturing apparatus 1, and further, it is possible to quickly cool the image sensor 101 by the first duct 10. Further, the first drive mechanism 130X and the second drive mechanism 130Y, which can exhibit the image stabilization function for the image sensor board 102, are arranged around the image sensor board 102, which contributes to size reduction of the image capturing apparatus 1. Further, the first drive mechanism 130X, the second drive mechanism 130Y, and the first duct 10 may be different in thickness along the Z-axis direction but are preferably the same. In a case where these components have the same thickness, this contributes to size reduction (thickness reduction) of the image capturing apparatus 1. Further, the duct connection section 15 is disposed at a location not overlapping the image sensor board 102 (image sensor unit 7), as viewed from the Z-axis direction. This makes it possible to effectively use part of the space around the image sensor board 102, as viewed from the Z-axis direction, as the space for disposing the duct connection section 15, which contributes to size reduction of the image capturing apparatus 1. Note that, depending on the configuration of the first duct 10, it is possible to arrange the first drive mechanism 130X and the first duct air discharge portion 10b across the optical axis OA, and arrange the second drive mechanism 130Y and the first duct air suction portion 10a across the optical axis OA.

As shown in FIG. 8B, the first duct 10 has a first duct cooling portion 10c opposed to the image sensor board 102, and heat is transferred from the image sensor board 102 to the first duct 10 via the first duct cooling portion 10c. A first clearance ΔX1 is formed between the first duct 10 and the image sensor-holding member 105 of the image sensor unit 7 in a direction in which the image sensor unit 7 is driven by the first drive mechanism 130X, i.e. in the X-axis direction. The first clearance ΔX1 is secured such that it is larger than a driving distance of the image sensor unit 7 over which the image sensor unit 7 is driven by the first drive mechanism 130X, i.e. a movement amount of the image sensor unit 7 in the X-axis direction. This makes it possible to prevent, when the image sensor unit 7 is moved in the X-axis direction, the image sensor unit 7 and the first duct 10 from interfering with each other regardless of the magnitude of the movement amount of the image sensor unit 7. Further, the first drive mechanism 130X is configured to include the first permanent magnet 121X, the first rear-side sheet metal 122X, and the first coil 104X, and to prevent the above-mentioned interference, the first duct 10 and the first rear-side sheet metal 122X are preferably the same in height in the Z-axis direction.

As shown in FIG. 8C, a second clearance ΔY1 is formed between the first duct 10 and the image sensor-holding member 105 of the image sensor unit 7 in a direction in which the image sensor unit 7 is driven by the second drive mechanism 130Y, i.e. in the Y-axis direction. The second clearance ΔY1 is secured such that it is larger than a driving distance of the image sensor unit 7 over which the image sensor unit 7 is driven by the second drive mechanism 130Y, i.e. a movement amount of the image sensor unit 7 in the Y-axis direction. This makes it possible to prevent, when the image sensor unit 7 is moved in the Y-axis direction, the image sensor unit 7 and the first duct 10 from interfering with each other regardless of the magnitude of the movement amount of the image sensor unit 7. Further, the second drive mechanism 130Y is configured to include the second permanent magnets 121Y, the second rear-side sheet metal 122Y, and the second coils 104Y, and to prevent the above-mentioned interference, the first duct 10 and the second rear-side sheet metal 122Y are preferably the same in height in the Z-axis direction.

Figure 9A:
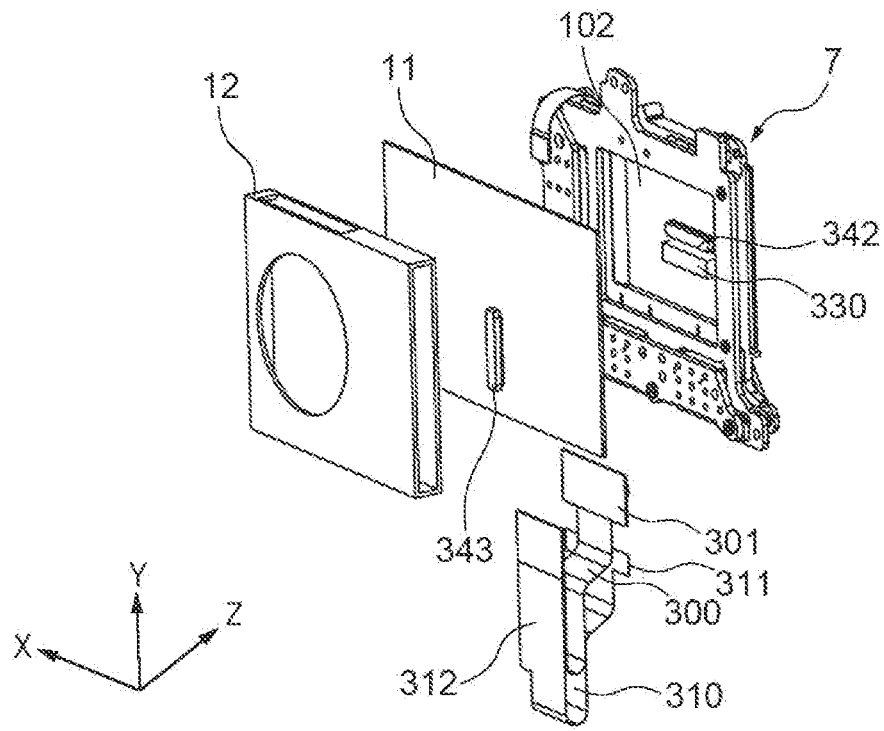
FIG. 9A is a rear exploded perspective view useful in explaining a first example of heat transfer from an image sensor unit.
Figure 9B:
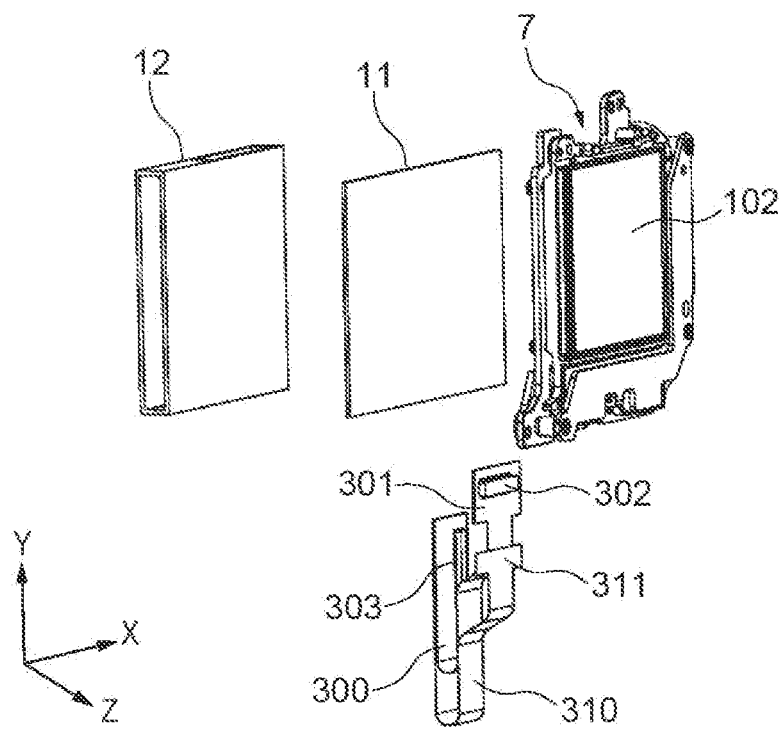
FIG. 9B is a front exploded perspective view useful in explaining the first example of heat transfer from the image sensor unit.
Figure 10:
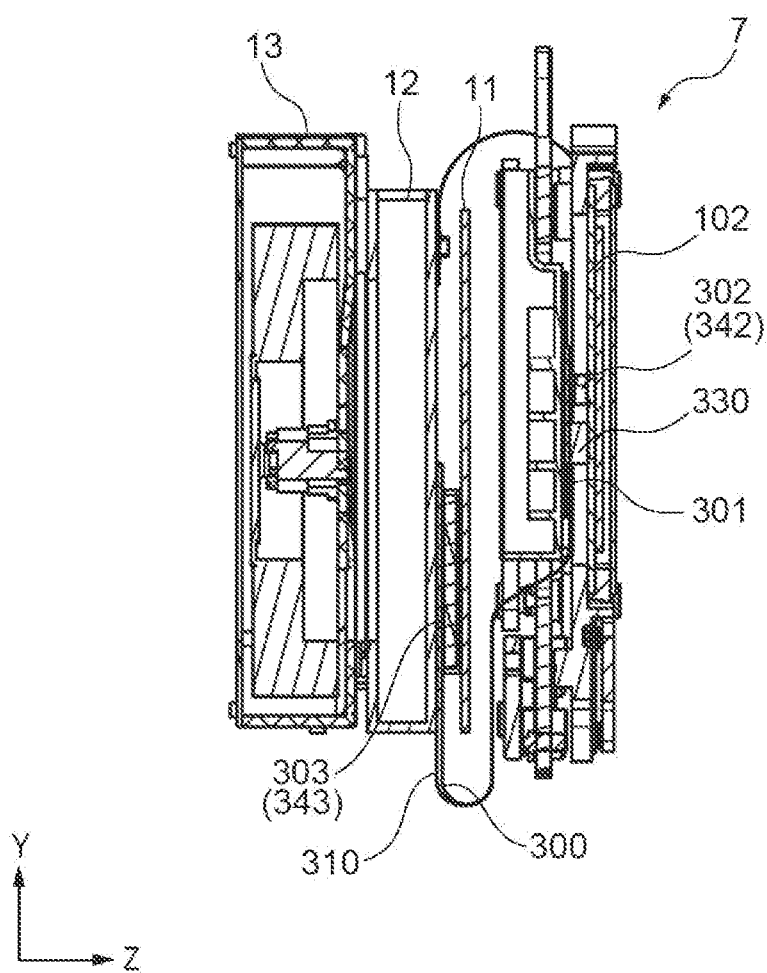
FIG. 10 is a cross-sectional view useful in explaining the first example of heat transfer from the image sensor unit.

A first example of heat transfer from the image sensor unit 7 will be described. FIG. 9A is a rear exploded perspective view useful in explaining the first example of heat transfer from the image sensor unit 7. FIG. 9B is a front exploded perspective view useful in explaining the first example of heat transfer from the image sensor unit 7. FIG. 10 is a cross-sectional view useful in explaining the first example of heat transfer from the image sensor unit 7. Note that FIG. 10 is a view extracting the relevant part from the cross-sectional view taken along B-B in FIG. 5A.

As shown in FIGS. 9A and 9B, the image sensor unit 7 has an electrical connection member (electrical connection portion) 300 and a reinforcing plate (reinforcing portion) 301. The electrical connection member 300 includes a first connection connector 302 which is connected to an image sensor board connector 342 of the image sensor board 102 and a second connection connector 303 which is connected to a control circuit board connector 343 of the control circuit board 11. With this, the image sensor board 102 is electrically connected to the control circuit board 11 via the electrical connection member 300, whereby the image sensor board 102 is controlled by the control circuit board 11. In the present embodiment, the electrical connection member 300 is a flexible circuit board having flexibility. With this flexibility, the electrical connection member 300 is disposed such that it is bent into a U-shape. That is, the electrical connection member 300 can be routed around. By thus disposing the electrical connection member 300, it is possible to prevent the driving of the image sensor unit 7 from being blocked. Although the electrical connection member 300 is disposed such that it is bent into the U-shape, this is not limitative, but for example, the electrical connection member 300 may be disposed such that it is bent into a shape different from the U-shape, such as an S-shape. Further, the first connection connector 302 and the second connection connector 303 are board-to-board connectors (B to B connector). This makes it possible to quickly perform a connection work. Further, the reinforcing plate 301 is a plate shaped member that reinforces the electrical connection member 300. On the reinforcing plate 301, the first connection connector 302 is disposed. With this arrangement, when connecting the first connection connector 302 to the image sensor board connector 342 of the image sensor board 102, it is possible to easily perform the connection work.

As shown in FIG. 10, the image sensor unit 7 has a heat conduction sheet 310 and a heat conduction member 330. The heat conduction sheet 310 has flexibility. With this flexibility, it is possible to dispose the heat conduction sheet 310 by bending the same into a U-shape similarly to the electrical connection member 300, in a state positioned side by side to the electrical connection member 300, i.e. in a state superposed on the electrical connection member 300. The heat conduction sheet 310 is a long sheet member formed e.g. by a graphite sheet which is relatively high in heat conductivity. As shown in FIGS. 9A and 9B, the heat conduction sheet 310 has one end having a surface formed as a first heat transfer surface 311 and the other end having a surface formed as a second heat transfer surface 312. The first heat transfer surface 311 faces the image sensor unit 7, and heat from the image sensor board 102 is transferred thereto. The second heat transfer surface 312 faces the second duct 12, and heat from the image sensor board 102 is transferred thereto. As shown in FIG. 9A, the heat conduction member 330 is arranged in the vicinity of the image sensor board connector 342. Heat from the image sensor board 102 is transferred to the first heat transfer surface 311 via the heat conduction member 330.

As shown in FIG. 10, the first connection connector 302 of the heat conduction sheet 310 and the heat conduction member 330 are arranged such that the first connection connector 302 and the heat conduction member 330 are accommodated in an area of a projected shadow of the reinforcing plate 301. That is, when viewed from the Z-axis direction, the heat conduction sheet 310 and the heat conduction member 330 at least partially overlap the reinforcing plate 301. Further, the heat conduction sheet 310 and the heat conduction member 330 are brought into contact with each other. With this, it is possible to use a space in the vicinity of the first connection connector 302 as a heat transfer area within the area of the projected shadow of the reinforcing plate 301 and thereby efficiently dissipate heat from the image sensor board 102. Further, the heat conduction member 330 is formed of a rubber material having elasticity and is disposed between the image sensor board 102 and the reinforcing plate 301 in a compressed state. A reaction force (restoring force) generated in the heat conduction member 330 in the compressed state is smaller than a connection force for maintaining connection between the image sensor board connector 342 of the image sensor board 102 and the first connection connector 302 of the electrical connection member 300. This makes it possible to prevent generation of stress in a direction of releasing connection between the image sensor board connector 342 and the first connection connector 302.

Figure 11A:
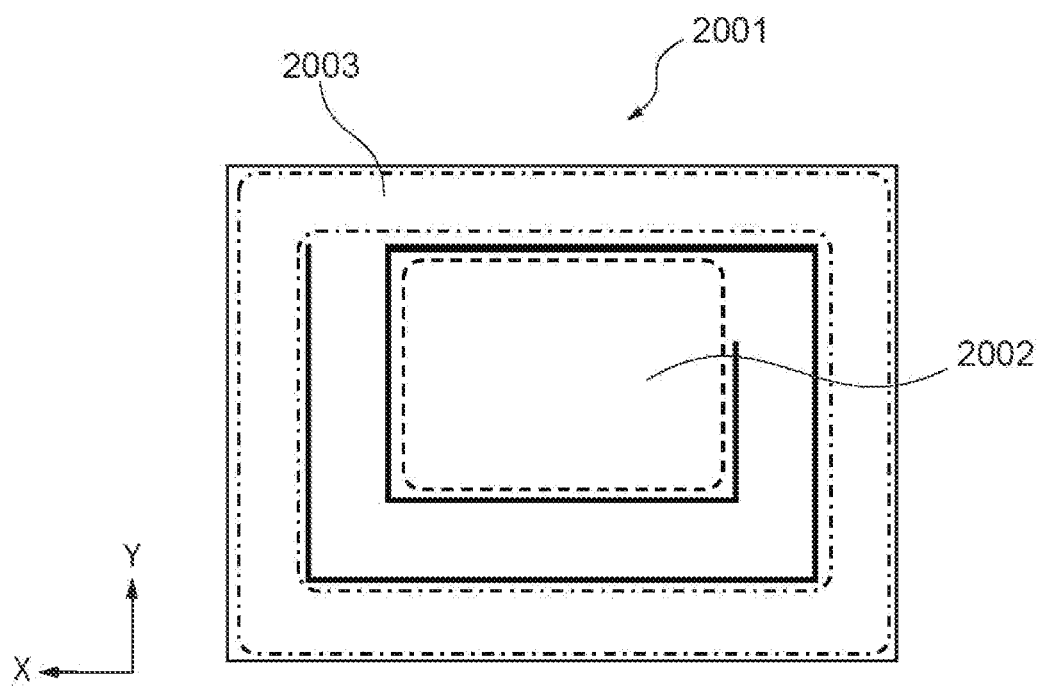
FIG. 11A is a front view of a heat conductive flexible member used for heat transfer.
Figure 11B:
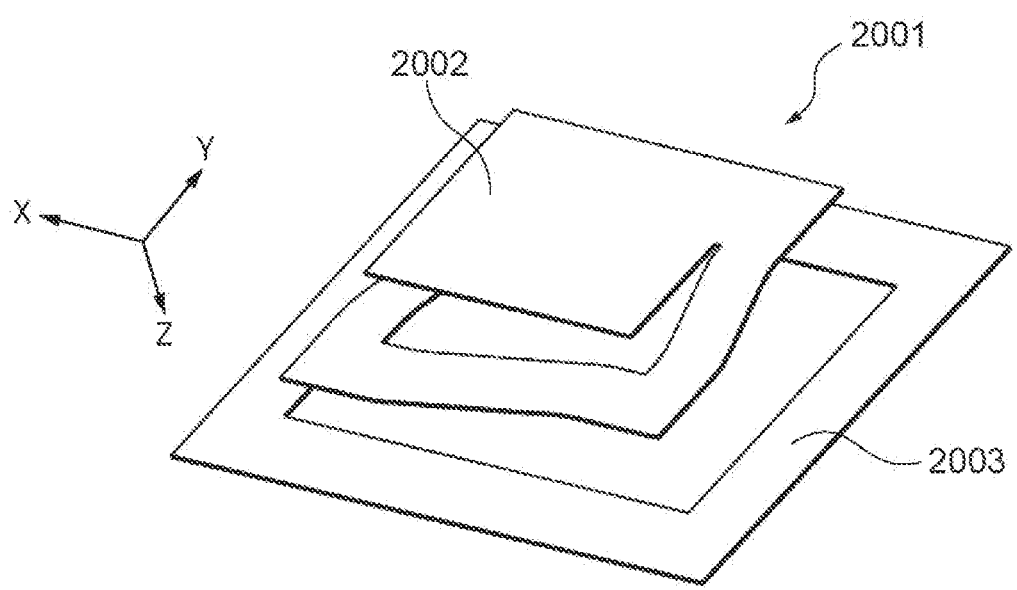
FIG. 11B is a perspective view showing an extended state (deformed state) of the heat conductive flexible member shown in FIG. 11A.
Figure 12A:
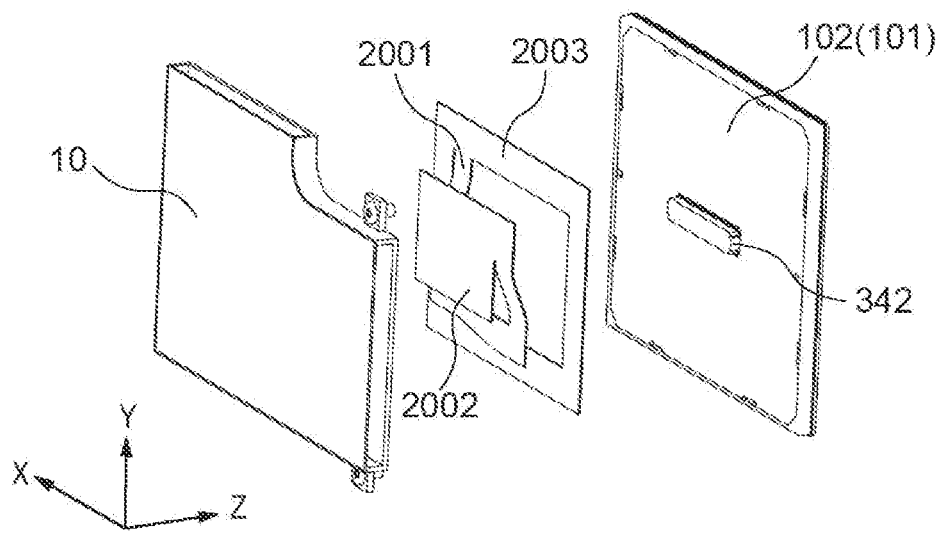
FIG. 12A is a rear exploded perspective view showing a positional relationship between an image sensor board, the heat conductive flexible member, and the first duct.
Figure 12B:
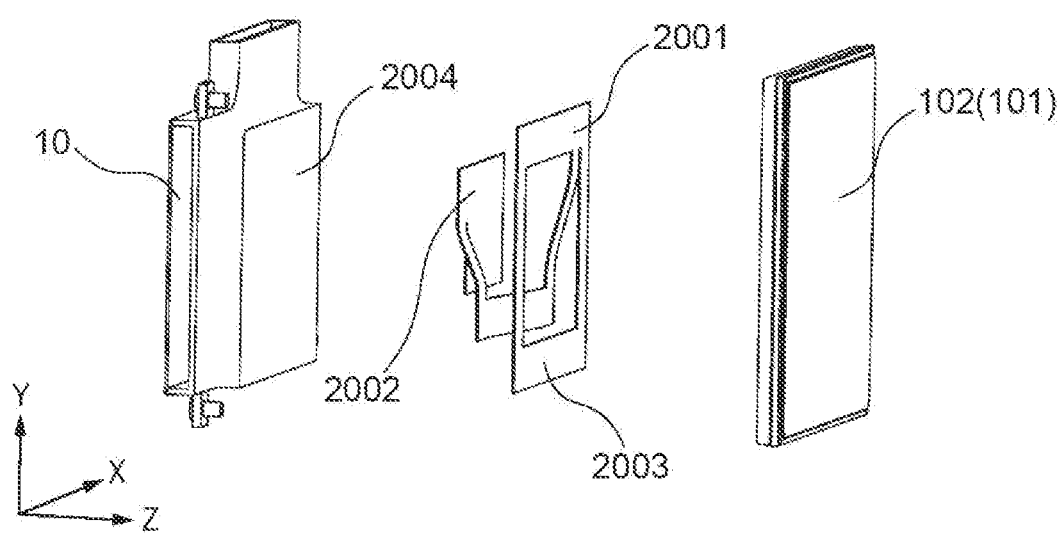
FIG. 12B is a front exploded perspective view showing the positional relationship between the image sensor board, the heat conductive flexible member, and the first duct.
Figure 13:
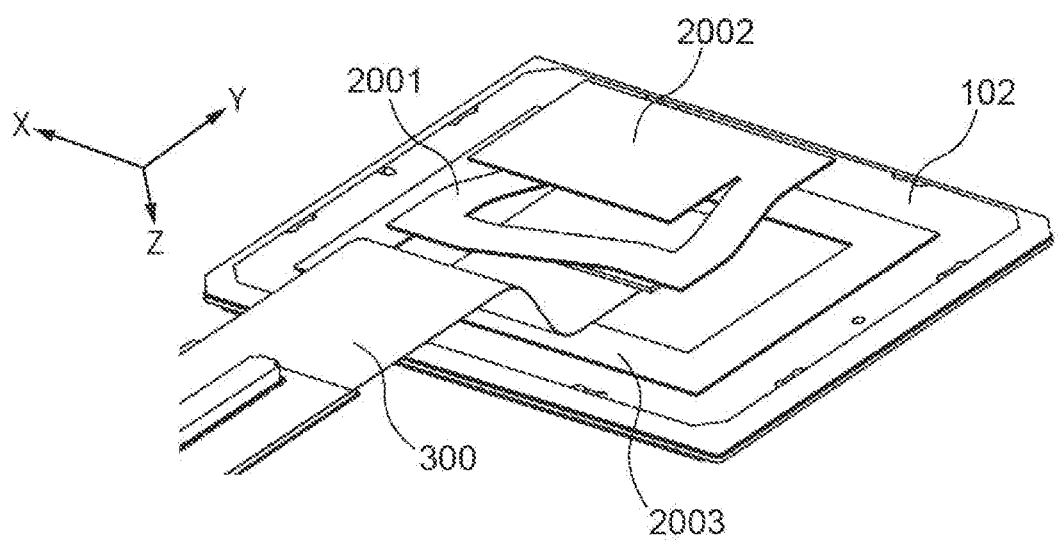
FIG. 13 is a perspective view showing a positional relationship between the image sensor board, the heat conductive flexible member, and an electrical connection member.

A second example of heat transfer from the image sensor unit 7 will be described. The second example of heat transfer is an example of heat transfer from the image sensor board 102 to the first duct 10. FIG. 11A is a front view of a heat conductive flexible member 2001 used for heat transfer. FIG. 11B is a perspective view showing an extended state (deformed state) of the heat conductive flexible member 2001 shown in FIG. 11A. FIG. 12A is a rear exploded perspective view showing a positional relationship between the image sensor board 102, the heat conductive flexible member 2001, and the first duct 10. FIG. 12B is a front exploded perspective view showing the positional relationship between the image sensor board 102, the heat conductive flexible member 2001, and the first duct 10. FIG. 13 is a perspective view showing a positional relationship between the image sensor board 102, the heat conductive flexible member 2001, and the electrical connection member 300.

The heat conductive flexible member (flexible heat conduction member) 2001 shown in FIG. 11A is formed by a sheet member, such as a graphite sheet which is relatively high in heat conductivity, and is connected to the image sensor unit 7 and the first duct 10. With this, the heat conductive flexible member 2001 can transfer heat from the image sensor unit 7 to the first duct 10. The heat conductive flexible member 2001 is formed into a spiral shape. With this, the heat conductive flexible member 2001 can extend and contract in the Z-axis direction (see FIG. 11B). Further, the heat conductive flexible member 2001 having a spiral shape has its central portion (central portion 2002 surrounded by broken lines in FIG. 11A) and an outer peripheral portion located around the outer periphery of the central portion 2002 (outer peripheral portion 2003 surrounded by one-dot-chain lines in FIG. 11A). The central portion 2002 is displaceable with respect to the outer peripheral portion 2003 in any of the X-axis direction, the Y-axis direction, and the Z-axis direction.

As shown in FIGS. 12A and 12B, the heat conductive flexible member 2001 is arranged between the image sensor board 102 and the first duct 10. Further, the outer peripheral portion 2003 of the heat conductive flexible member 2001 is connected to a surface of the image sensor board 102, on which the image sensor board connector 342 is disposed, and the central portion 2002 is connected to a front surface (duct heat transfer surface 2004) of the first duct 10. This makes it possible to sufficiently transfer heat of the image sensor board 102 to the first duct 10. Further, when the image sensor board 102 is driven, the heat conductive flexible member 2001 can follow the movement of the image sensor board 102 by extending/contracting in the driving direction and is prevented from interfering with the movement of the image sensor board 102. In the present embodiment, out of the central portion 2002 and the outer peripheral portion 2003, the outer peripheral portion 2003 is connected to the image sensor unit 7, and the central portion 2002 is connected to the first duct 10, but this is not limitative. For example, the central portion 2002 may be connected to the image sensor unit 7, and the outer peripheral portion 2003 may be connected to the first duct 10. Further, the heat conductive flexible member 2001 may be connected to part of the image sensor unit 7 other than the image sensor board 102.

As mentioned above, the heat conductive flexible member 2001 has the spiral shape. This makes it possible to pass the electrical connection member 300 between the central portion 2002 and the outer peripheral portion 2003 along a surface of the heat conductive flexible member 2001 as shown in FIG. 13. This arrangement contributes to reduction of the thickness of the image capturing apparatus 1.

Figure 14:
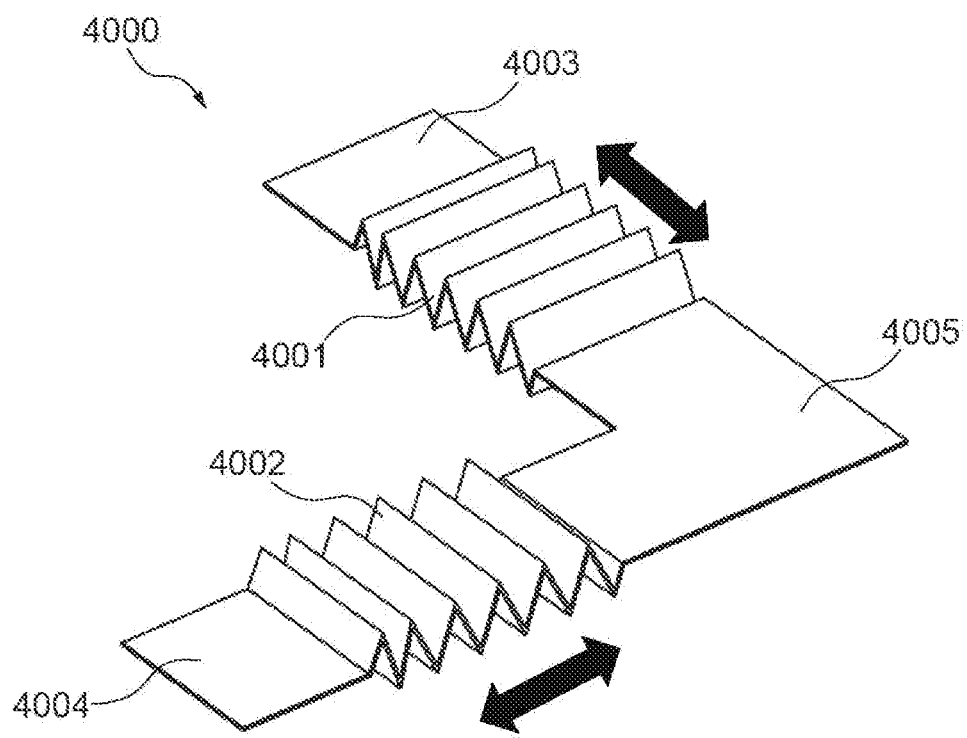
FIG. 14 is a perspective view of a heat dissipation sheet used for heat transfer.
Figure 15:
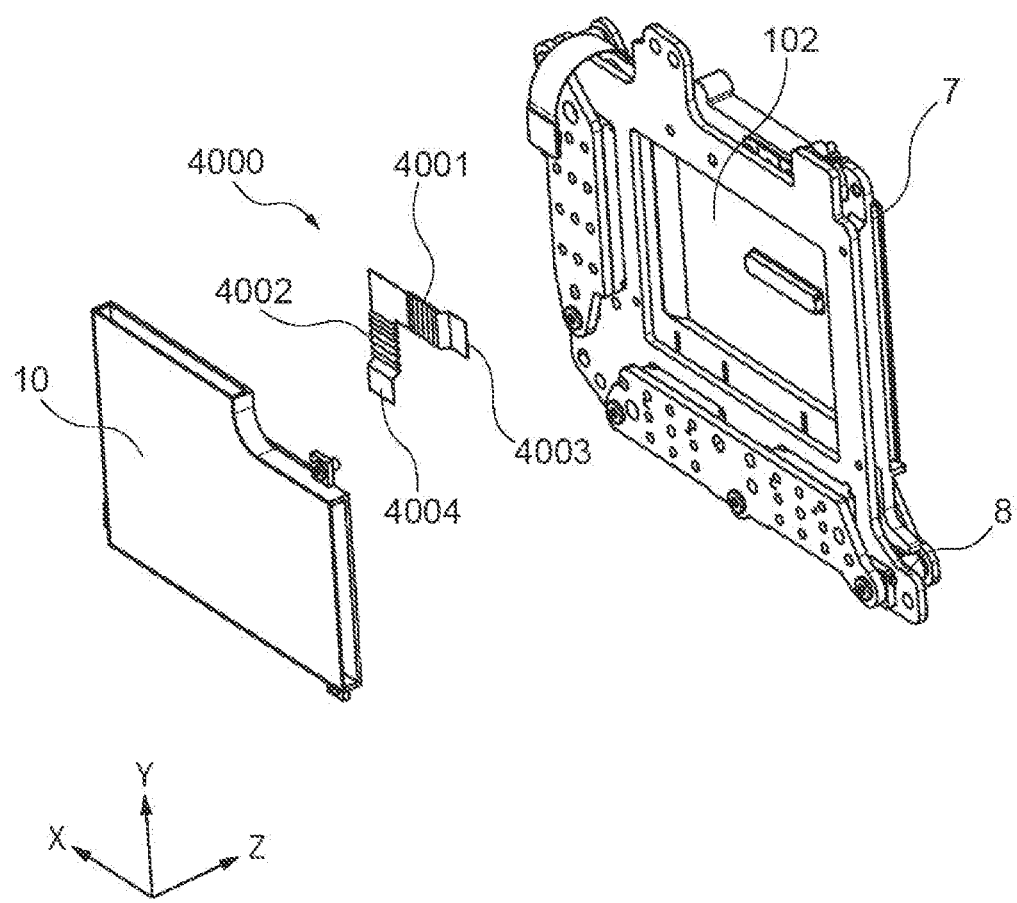
FIG. 15 is an exploded perspective view useful in explaining heat transfer from the image sensor unit to the first duct.

A third example of heat transfer from the image sensor unit 7 will be described. The third example of heat transfer is an example of heat transfer from the image sensor board 102 to the first duct 10. FIG. 14 is a perspective view of a heat dissipation sheet 4000 used for heat transfer. FIG. 15 is an exploded perspective view useful in explaining heat transfer from the image sensor unit 7 to the first duct 10.

The heat dissipation sheet (flexible heat conduction member) 4000 shown in FIG. 14 is a long sheet member having flexibility, formed e.g. by a graphite sheet relatively high in heat conductivity, and is connected to the image sensor unit 7 and the first duct 10. With this, the heat dissipation sheet 4000 can transfer heat from the image sensor unit 7 to the first duct 10. The heat dissipation sheet 4000 has a first bellows portion 4001 toward one end 4003, a second bellows portion 4002 toward the other end 4004, and a connection portion 4005 which connects between the first bellows portion 4001 and the second bellows portion 4002. The first bellows portion 4001 has a bellows shape formed by repeating a top fold portion and a bottom fold portion and is extendable/contractable in the X-axis direction (see FIG. 15). The second bellows portion 4002 has a bellows shape formed by repeating a top fold portion and a bottom fold portion and is extendable/contractable in a direction orthogonal to (different from) the extending/contracting direction of the first bellows portion 4001, i.e. the Y-axis direction (see FIG. 15). Further, the connection portion 4005 as part between the first bellows portion 4001 and the second bellows portion 4002 is lower in stretchability than the first bellows portion 4001 and the second bellows portion 4002 (has no stretchability in the present embodiment). With this, the first bellows portion 4001 and the second bellows portion 4002 can preferentially extend/contract in the heat dissipation sheet 4000. Although the extending/contracting direction of the first bellows portion 4001 and the extending/contracting direction of the second bellows portion 4002 are orthogonal to each other in the present embodiment, these directions are not limited to be orthogonal to each other, but they are only required to be different from each other.

As shown in FIG. 15, the heat dissipation sheet 4000 is disposed between the image sensor unit 7 and the first duct 10. Further, the heat dissipation sheet 4000 has the one end 4003 (toward the first bellows portion 4001) connected to the image sensor board 102 of the image sensor unit 7, and the other end 4004 (toward the second bellows portion 4002) connected to the first duct 10. This makes it possible to sufficiently transfer heat from the image sensor board 102 to the first duct 10. Further, when the image sensor board 102 is driven, the heat dissipation sheet 4000 can follow the movement of the image sensor board 102 by independent extension/contraction of the first bellows portion 4001 and the second bellows portion 4002. This makes it possible to prevent the heat dissipation sheet 4000 from interfering with the movement of the image sensor board 102, whereby the image stabilization function for the image sensor unit 7 is sufficiently exhibited. Although in the present embodiment, out of the first bellows portion 4001 and the second bellows portion 4002, the first bellows portion 4001 side is connected to the image sensor unit 7, and the second bellows portion 4002 side is connected to the first duct 10, this is not limitative. For example, the second bellows portion 4002 side may be connected to the image sensor unit 7, and the first bellows portion 4001 side may be connected to the first duct 10.

Figure 16:
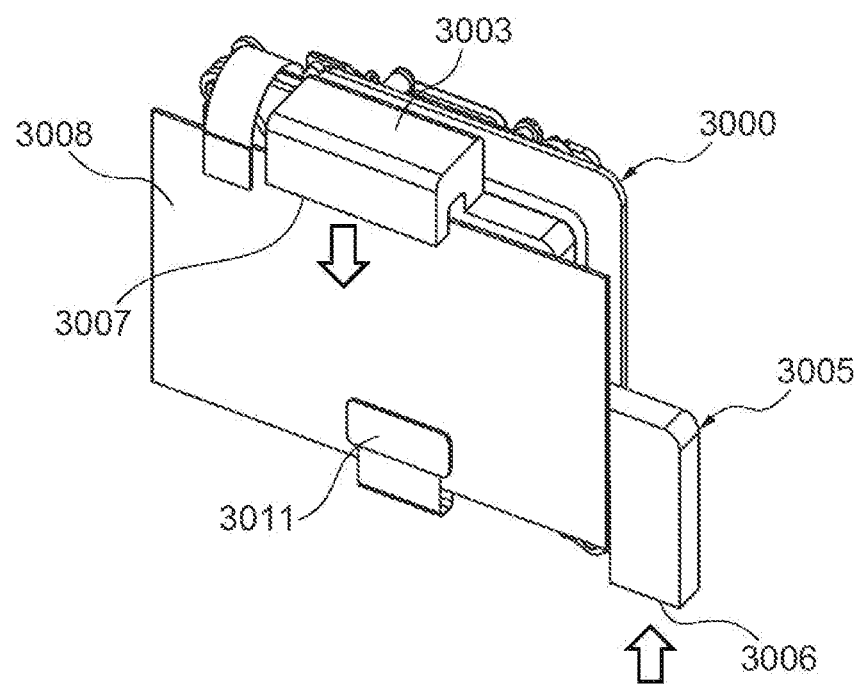
FIG. 16 is a perspective view showing internal components from an image sensor unit to a control circuit board of an image capturing apparatus according to a second embodiment.
Figure 17:
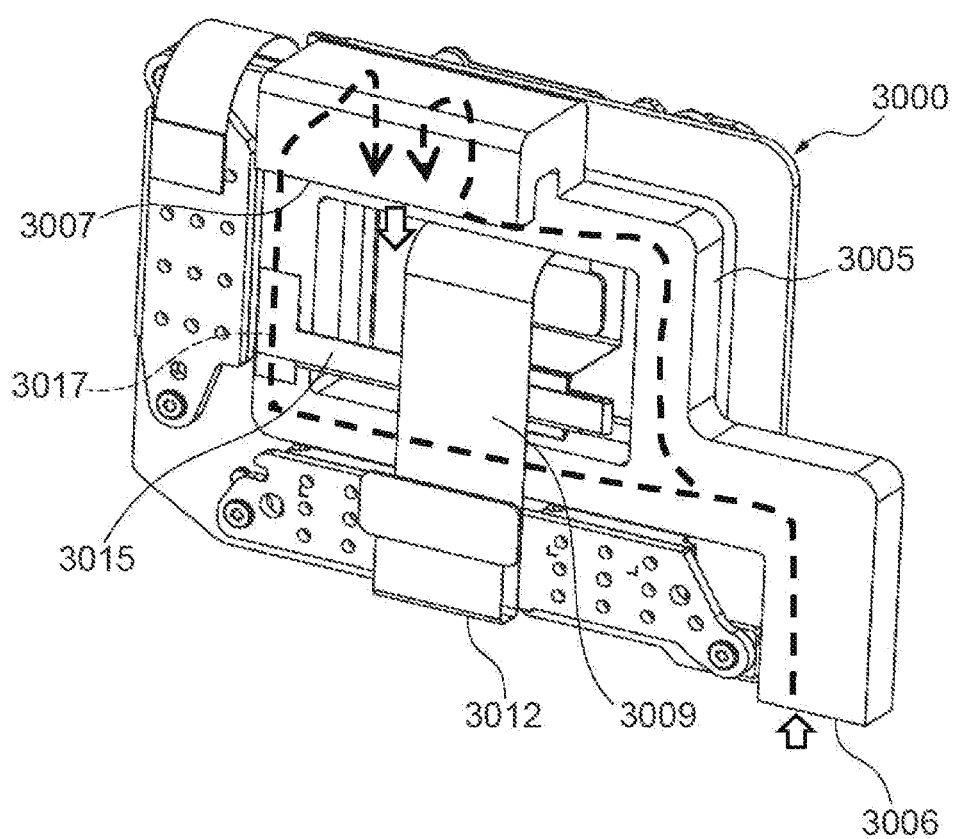
FIG. 17 is a perspective view of a state in which the control circuit board appearing in FIG. 16 is hidden.
Figure 18A:
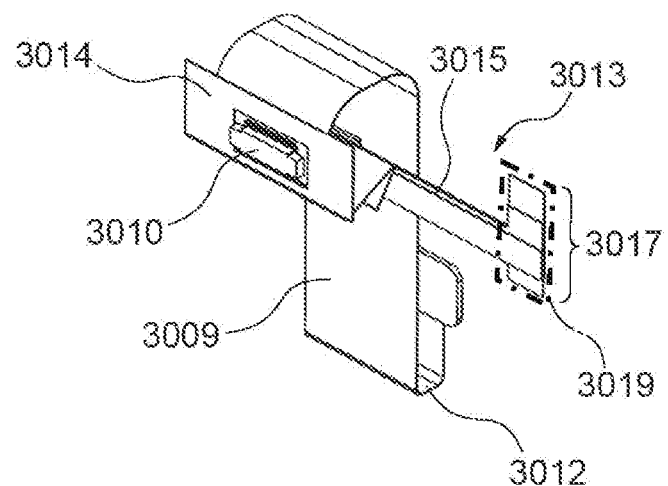
FIG. 18A is a perspective view of a state in which a heat dissipation sheet and a flexible wiring member are connected.
Figure 18B:
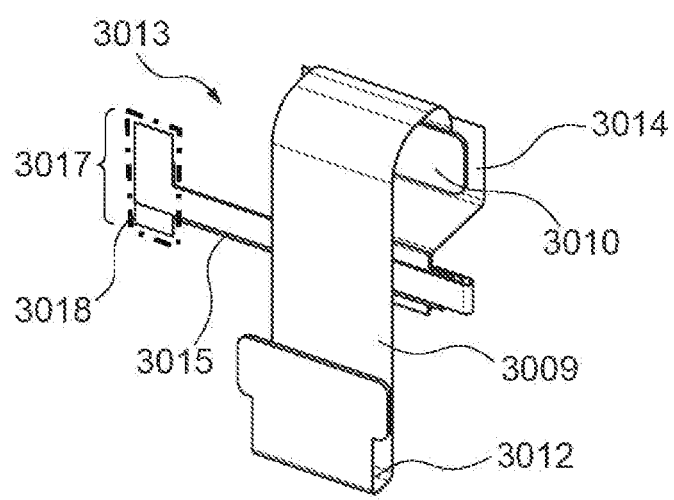
FIG. 18B is a perspective view of the state in which the heat dissipation sheet and the flexible wiring member are connected.

A second embodiment will be described below with reference to FIGS. 16 to 20, but the description will be mainly given of different points from the above-described first embodiment, and description of the same points is omitted. FIG. 16 is a perspective view showing the internal components from the image sensor unit 7 to a control circuit board 3008. FIG. 17 is a perspective view of a state in which the control circuit board 3008 appearing in FIG. 16 is hidden. FIGS. 18A and 18B are perspective views of a state in which a heat dissipation sheet 3013 and a flexible wiring member 3009 are connected. FIG. 19A to FIG. 19F are views showing the heat dissipation sheet 3013. FIG. 20A is a vertical cross-sectional view of the state shown in FIG. 16. FIG. 20B is a horizontal cross-sectional view of the state shown in FIG. 16.

Similar to the first embodiment, an image sensor board 3000 appearing in FIG. 16 is driven for image stabilization by an image stabilization mechanism 3002 during photographing. As shown in FIGS. 20A and 20B, the image sensor board 3000 has an image sensor 3001 mounted thereon, and a first heat dissipation duct 3005 is disposed on an opposite side of the image sensor board 3000 to the surface on which the image sensor 3001 is mounted. The first heat dissipation duct 3005 includes a first heat dissipation duct body 3003 and a first heat dissipation duct cover 3004 having a plate shape, and when these components are assembled, an air flow passage through which air passes is formed inside. The first heat dissipation duct 3005 has a first heat dissipation duct air inlet port 3006 for suctioning air and a first heat dissipation duct air outlet port 3007 (see FIG. 17) for discharging air. The control circuit board 3008 is disposed on a side of the first heat dissipation duct body 3003 of the first heat dissipation duct 3005.

The control circuit board 3008 and the image sensor board 3000 are electrically connected via the flexible wiring member 3009. The flexible wiring member 3009 includes an image sensor board connection portion 3010 connected to the image sensor board 3000, a control board connection portion 3011 connected to the control circuit board 3008, and a connection portion 3012 which connects between the image sensor board connection portion 3010 and the control board connection portion 3011. The connection portion 3012 has flexibility and is disposed such that it is bent into a U-shape. With this, when the image sensor board 102 is driven by the image stabilization mechanism 3002, the connection portion 3012 can follow the movement by being deformed in the driving direction and is prevented from interfering with the movement of the image senor board 3000. Further, the length of the connection portion 3012 is sufficiently secured to a degree which enables the connection portion 3012 to follow the movement of the image sensor board 3000 regardless of the movement amount of the image senor board 3000.

The heat dissipation structure of the image capturing apparatus 1 will be described. Although not shown in the present embodiment, the second duct 12 and the cooling fan 13, described in the first embodiment, are arranged on a side of the control circuit board 3008 opposite to the first heat dissipation duct 3005. Further, the first heat dissipation duct air inlet port 3006 is connected to the first air inlet port 5, and the first heat dissipation duct air outlet port 3007 is connected to the second duct air inlet port 12b of the second duct 12. Air is suctioned from the first heat dissipation duct air inlet port 3006 in accordance with the operation of the cooling fan 13. This air flows as indicated by arrows in FIG. 17, sequentially passes through the first heat dissipation duct air outlet port 3007 and the second duct 12, and is discharged from the first air outlet port 4. With this air flow, it is possible to forcedly dissipate heat transferred to the first heat dissipation duct 3005.

The structure of the heat dissipation sheet will be described. As shown in FIG. 20B, the heat dissipation sheet (heat conduction sheet) 3013 is provided on a surface of the image sensor board 3000, opposite to a surface on which the image sensor 3001 is mounted. The heat dissipation sheet 3013 is a single sheet member that is connected to the image sensor board 3000 and the first heat dissipation duct 3005 via the image sensor board connection portion 3010 of the flexible wiring member 3009 and dissipates (transfers) heat from the image sensor board 3000 to the first heat dissipation duct 3005 when the image capturing apparatus 1 is in operation.

Figure 19A:
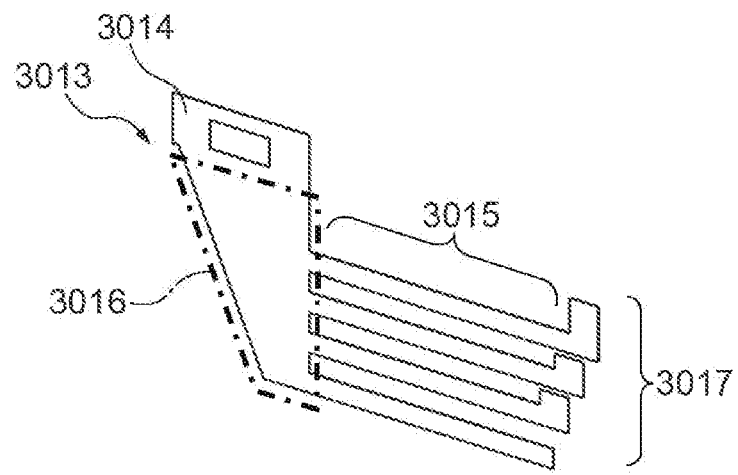
FIG. 19A is a view showing the heat dissipation sheet.
Figure 19B:
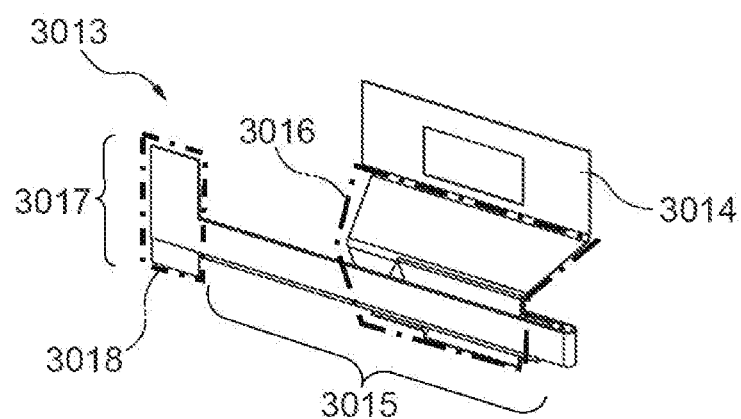
FIG. 19B is a view showing the heat dissipation sheet.
Figure 19C:
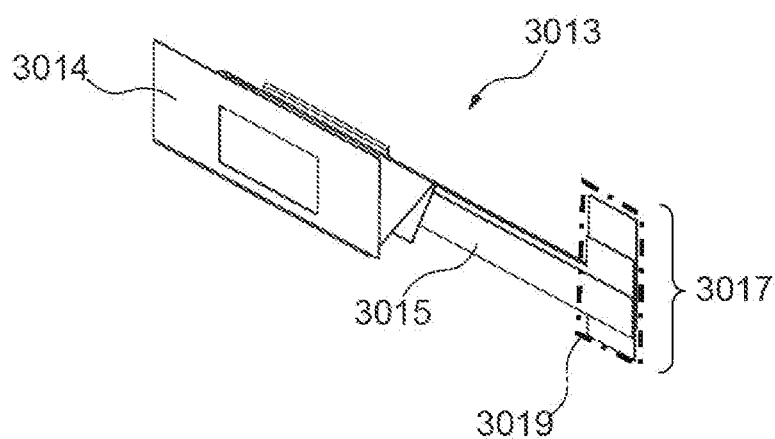
FIG. 19C is a view showing the heat dissipation sheet.

As shown in a developed state in FIG. 19A, the heat dissipation sheet 3013 includes a flexible wiring member-fixing portion 3014, a plurality of arm portions each formed into a belt shape (belt-shaped portions) 3015, which are independent of each other, and an intermediate portion 3016 which connects between the flexible wiring member-fixing portion 3014 and the arm portions 3015. The flexible wiring member-fixing portion 3014 is fixed to the image sensor board connection portion 3010 of the flexible wiring member 3009. As shown in FIGS. 19B to 19F, the heat dissipation sheet 3013 is formed by superposing the arm portions 3015 on one another and folding the intermediate portion 3016, into a state having a superposed part formed by a bundle of the superposed and folded portions. Although part of the heat dissipation sheet 3013 toward the first heat dissipation duct 3005 is formed by the superposed part, this is not limitative, but for example, the whole heat dissipation sheet 3013 may be formed by the superposed part. The arm portions 3015 are different in the width of an end portion from one other. With this, on a first heat dissipation duct non-contact surface 3018 (see FIG. 19B) which is not in surface contact with the first heat dissipation duct 3005, surfaces of only two arms out of the four arms are exposed. Further, on a first heat dissipation duct contact surface 3019 (see FIG. 19C) which is in surface contact with the first heat dissipation duct 3005, surfaces of end portions 3017 of the respective four arm portions 3015 are exposed.

Although the heat dissipation sheet 3013 is formed by the single sheet member in the present embodiment, this is not limitative, but for example, the heat dissipation sheet 3013 may be formed by superposing a plurality of sheet members.

Figure 19D:
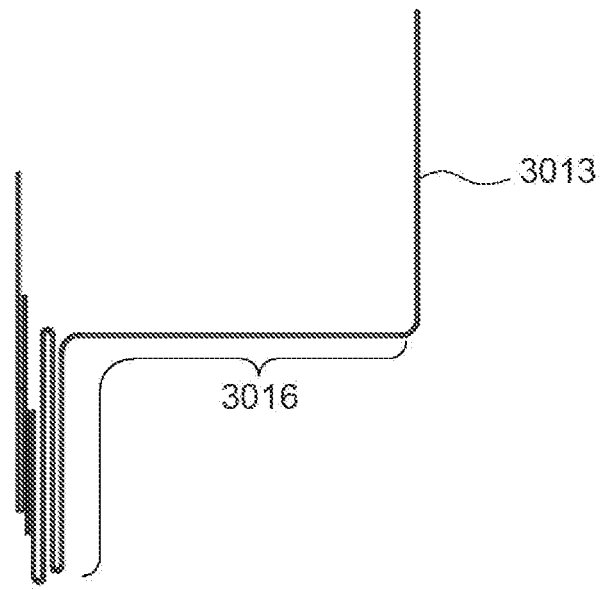
FIG. 19D is a view showing the heat dissipation sheet.
Figure 19E:
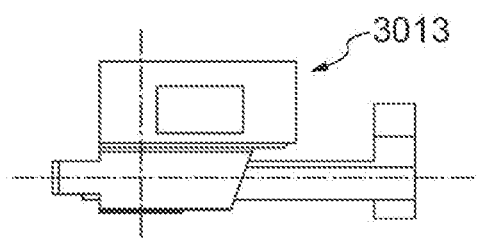
FIG. 19E is a view showing the heat dissipation sheet.
Figure 19F:
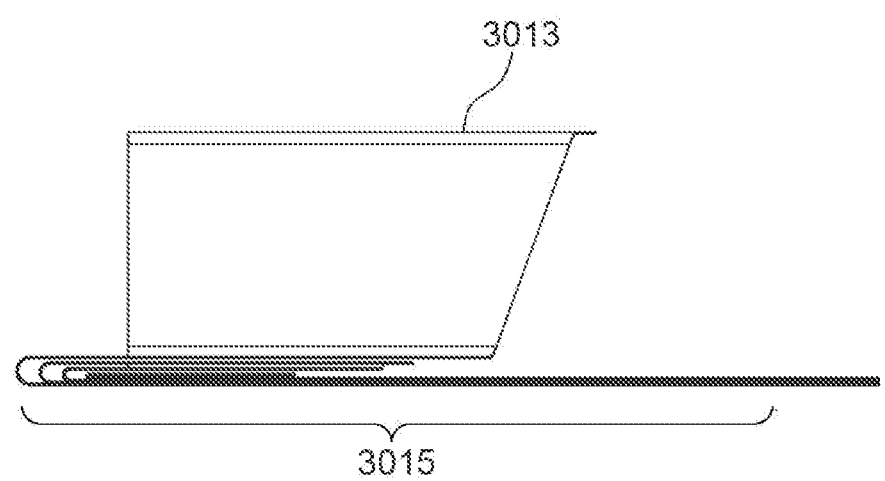
FIG. 19F is a view showing the heat dissipation sheet.
Figure 20A:
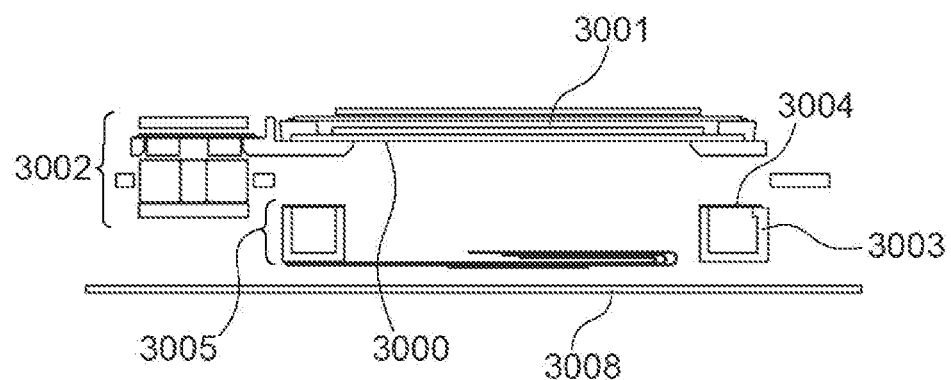
FIG. 20A is a vertical cross-sectional view of internal components from the image sensor unit to the control circuit board, shown in FIG. 16.
Figure 20B:
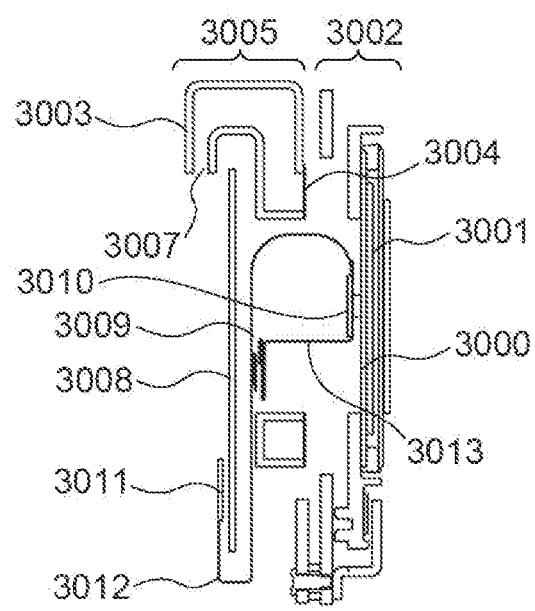
FIG. 20B is a horizontal cross-sectional view of the internal components from the image sensor unit to the control circuit board, shown in FIG. 16.

As shown in FIGS. 18A and 18B, the heat dissipation sheet 3013 has the flexible wiring member-fixing portion 3014 brought into contact with and fixed to the image sensor board connection portion 3010 of the flexible wiring member 3009. With this, heat from the flexible wiring member 3009 can be absorbed by the heat dissipation sheet 3013. The heat dissipation sheet 3013 has a portion extending from the intermediate portion 3016 to an end separated from the flexible wiring member 3009 and folded as shown in FIGS. 19D and 19F. Of the heat dissipation sheet 3013, the arm portions 3015 in a range of the folded portion are collectively bent into a U-shape. With this, as shown in FIG. 17, it is possible to bring the end portions 3017 (the first heat dissipation duct contact surface 3019 appearing in FIGS. 18A and 19C) into contact with the first heat dissipation duct 3005. As described above, heat transferred from the image sensor board 3000 to the flexible wiring member-fixing portion 3014 is transferred to the arm portions 3015 and dissipated from the end portions 3017 into the first heat dissipation duct 3005. The amount of heat transferred by the heat dissipation sheet 3013 is substantially proportional to a cross-sectional area of the sheet dissipation sheet 3013, and hence it is possible to transfer heat in an amount obtained by multiplying the amount of heat transferred via one arm portion 3013 by the number of the arm portions 3015. Further, on the end portions 3017, heat is dissipated by bringing the first heat dissipation duct contact surface 3019 on which the surfaces of the arm portions 3015 are exposed into contact with the first heat dissipation duct 3005, and hence an effect of contact heat transfer from the heat dissipation sheet 3013 is increased.

A third embodiment will be described below with reference to FIGS. 21 to 28, but the description will be mainly given of different points from the above-described first and second embodiments, and description of the same points is omitted.

Figure 21:
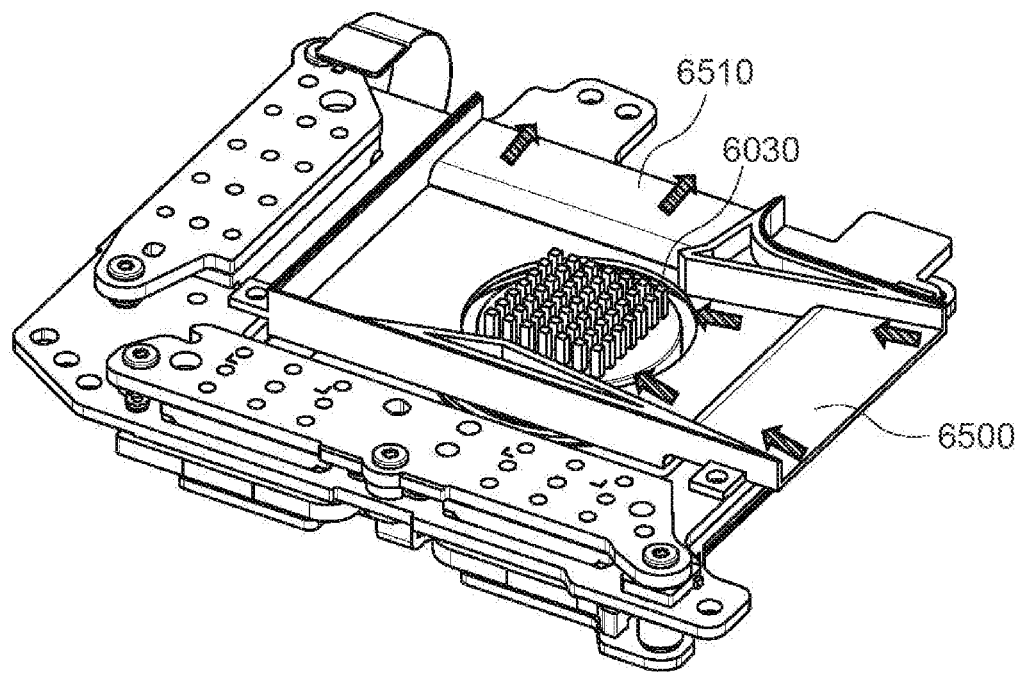
FIG. 21 is a perspective view showing an image sensor unit and a structure for cooling an image capturing section of an image capturing apparatus according to a third embodiment.
Figure 22:
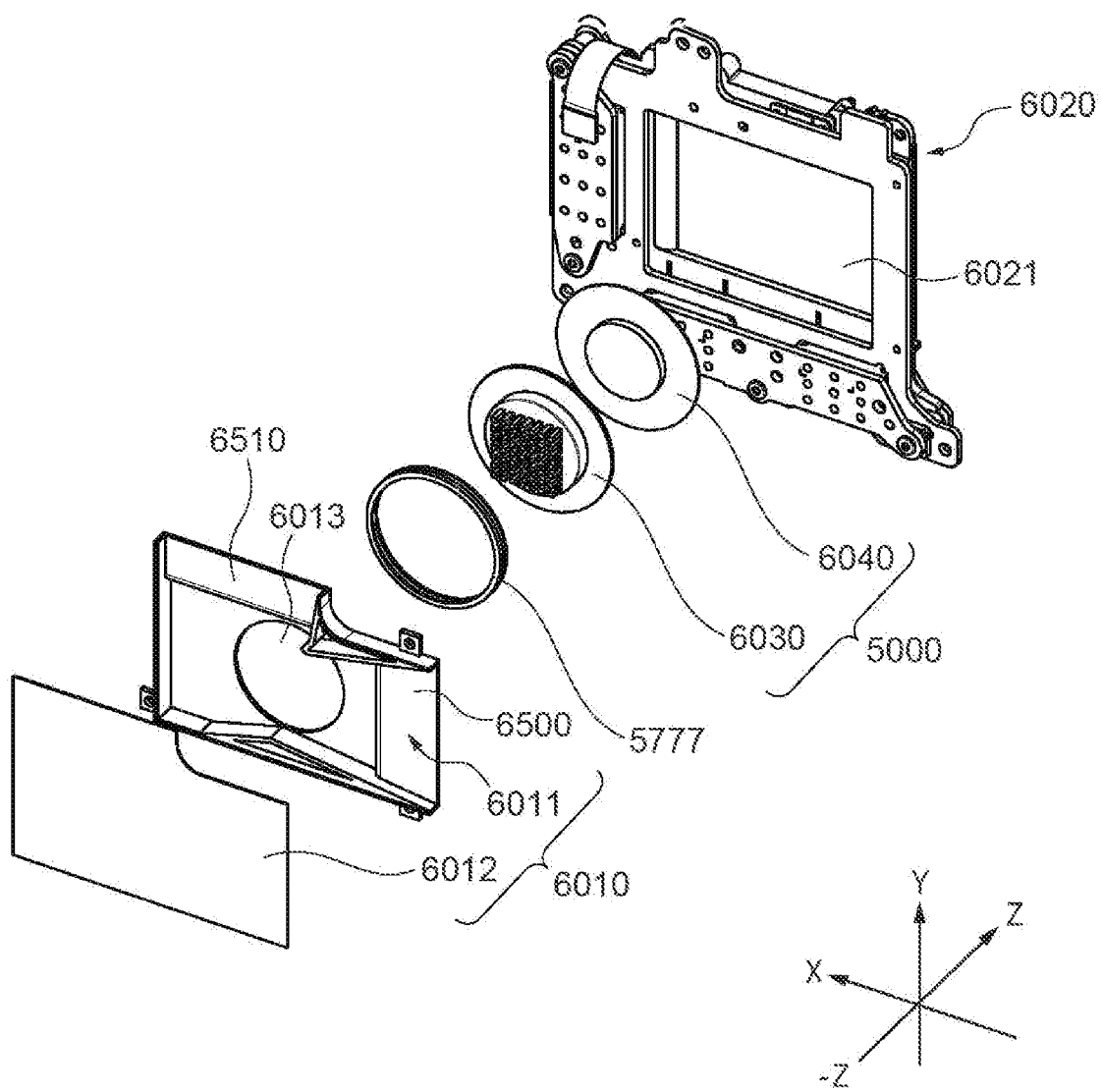
FIG. 22 is an exploded perspective view showing the image sensor unit and the structure for cooling the image capturing section.

FIG. 21 is a perspective view showing an image sensor unit 6020 and a structure for cooling an image capturing section. FIG. 22 is an exploded perspective view showing the image sensor unit 6020 and the structure for cooling the image capturing section. As shown in FIG. 22, a heat dissipation grease-applied portion 6040, a heat dissipation fins portion 6030, a heat dissipation member 5777, and a first duct 6010 are disposed in order from the image sensor unit 6020, on a rear side (a negative side in the Z-axis direction) of the image sensor unit 6020. The first duct 6010 is a duct for cooling an image sensor board 6021 of the image sensor unit 6020 and includes an air inlet port 6500 and an air outlet port 6510. Air (outside air) is suctioned from the air inlet port 6500 in accordance with the operation of the cooling fan 13, not shown, and discharged from the air outlet port 6510 (see FIG. 21). After that, the air merges with air flowing in the second duct 12 and the resulting air is discharged to the outside of the image capturing apparatus 1. The heat dissipation fins portion 6030 forms, in combination with the heat dissipation grease-applied portion 6040, a heat dissipation unit 5000 that dissipates heat from the image sensor board 6021. The heat dissipation fins portion 6030 is fixed to the image sensor board 6021 via the heat dissipation grease-applied portion 6040. The heat dissipation fins portion 6030 is cooled by air passing through the first duct 6010. With this, it is possible to dissipate heat from the image sensor unit 6020, which is taken by the heat dissipation fins portion 6030.

The first duct 6010 includes a first duct base 6011 and a first duct cover 6012, and by assembling these components, an air flow passage through which air passes is formed inside. The first duct base 6011 has a fins portion insertion hole 6013 formed therethrough. The heat dissipation fins portion 6030 is inserted into the first duct 6010 through this fins portion insertion hole 6013. The heat dissipation member 5777 is a hollow member having a ring shape that connects between the heat dissipation fins portion 6030 (heat dissipation unit 5000) and the first duct 6010 and communicates with the first duct 6010 via the fins portion insertion hole 6013. The heat dissipation member 5777 has a bellows shape and can extend/contract in the Z-axis direction. The heat dissipation member 5777 is in a compressed state between the heat dissipation fins portion 6030 and the first duct 6010.

Figure 23:
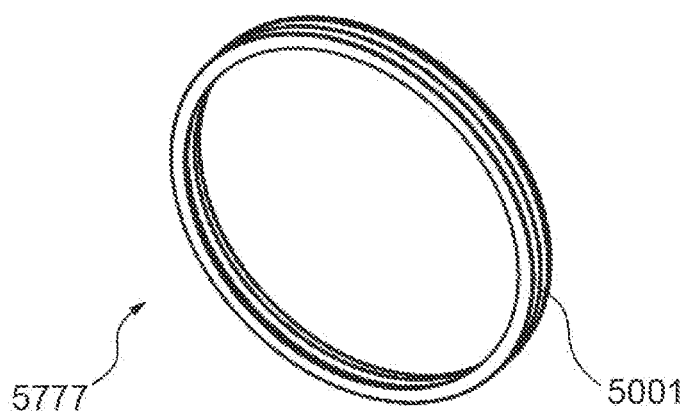
FIG. 23 is a perspective view showing a heat dissipation member.
Figure 24:
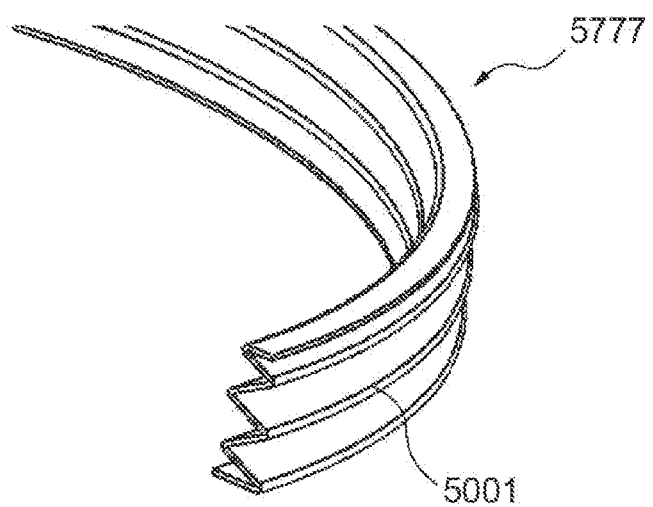
FIG. 24 is an enlarged perspective view of the heat dissipation member shown in FIG. 23.
Figure 25:
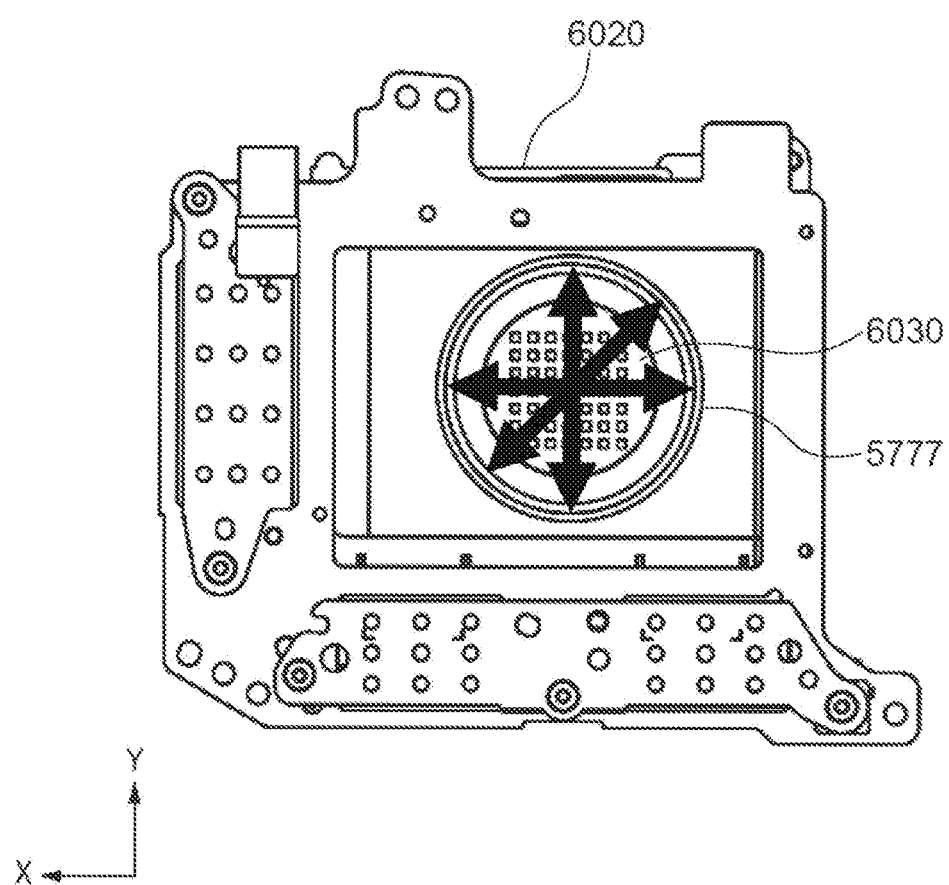
FIG. 25 is a view of the image sensor unit, as viewed from the first duct side.

FIG. 23 is a perspective view showing the heat dissipation member 5777. FIG. 24 is an enlarged perspective view of the heat dissipation member 5777 shown in FIG. 23. FIG. 25 is a view of the image sensor unit 6020, as viewed from the first duct 6010. As shown in FIGS. 23 and 24, the heat dissipation member 5777 is a ring-shaped (tubular) member and has its wall portion 5001 formed into a bellows shape by repeating a top fold portion and a bottom fold portion. Since the heat dissipation member 5777 is formed into the bellows shape, the heat dissipation member 5777 is enabled to deform by extending/contracting in accordance with the driving of the image sensor unit 6020. With this, the heat dissipation member 5777 can secure airtightness with the first duct 6010 regardless of the magnitude of the driving amount of the image sensor unit 6020. Here, a reaction force generated in the heat dissipation member 5777 in accordance with driving of the image sensor unit 6020 will be described with reference to FIG. 25. Arrows in FIG. 25 each indicate a reaction force. The image sensor unit 6020 can be driven in upper-lower and right-left directions by the above-described image stabilization structure. Since the heat dissipation member 5777 has the ring shape, if the driving amount of the image sensor unit 6020 is the same in all of the upper-lower and the right-left directions, the reaction forces also become the same without depending on the driving direction of the image sensor unit 6020. Further, when the image sensor unit 6020 is driven for rotation about a central axis of the heat dissipation member 5777, parallel to the Z-axis direction, the same reaction force is generated. With this, the heat dissipation member 5777 is prevented from being changed in reaction force from one time to another depending on the driving direction of the image sensor unit 6020, whereby the driving of the image sensor unit 6020 is properly controlled. The heat dissipation member 5777 is made of a material which is relatively high in heat conductivity. This makes it possible to transfer heat from the heat dissipation fins portion 6030 to the first duct 6010 via the heat dissipation member 5777. Further, since the heat dissipation member 5777 is formed into the bellows shape, it is possible to secure a wide area where the heat dissipation member 5777 is in contact with air flowing through the fins portion insertion hole 6013. This makes it possible to efficiently cool the image sensor unit 6020.

Figure 26:
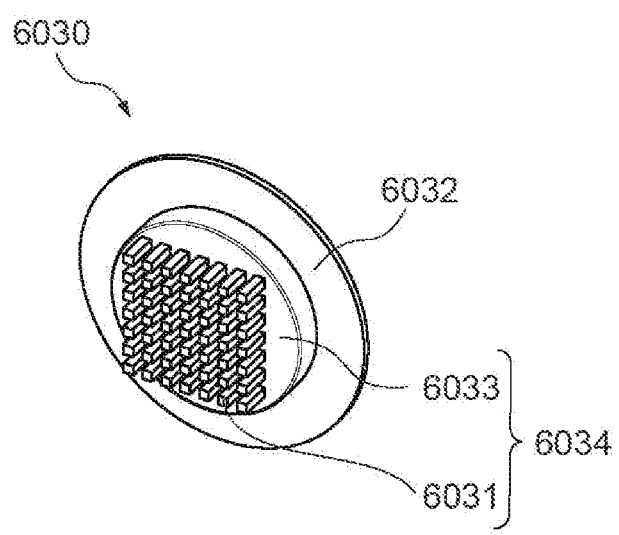
FIG. 26 is a perspective view showing heat dissipation fins.
Figure 27:
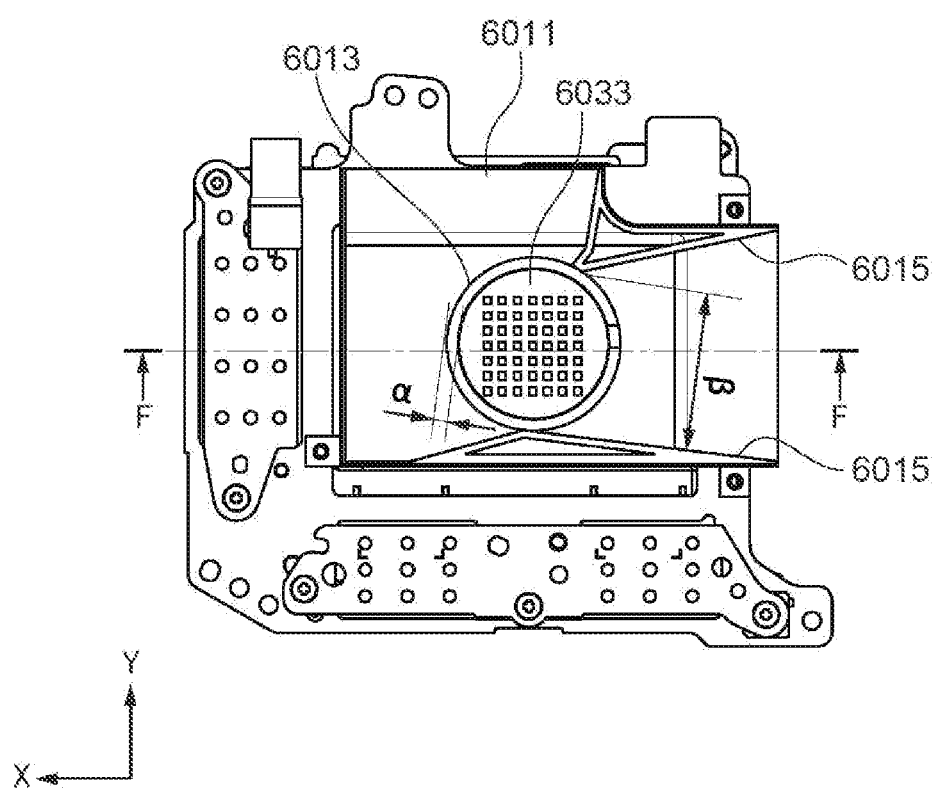
FIG. 27 is a view showing a positional relationship between the first duct and the heat dissipation fins.
Figure 28:
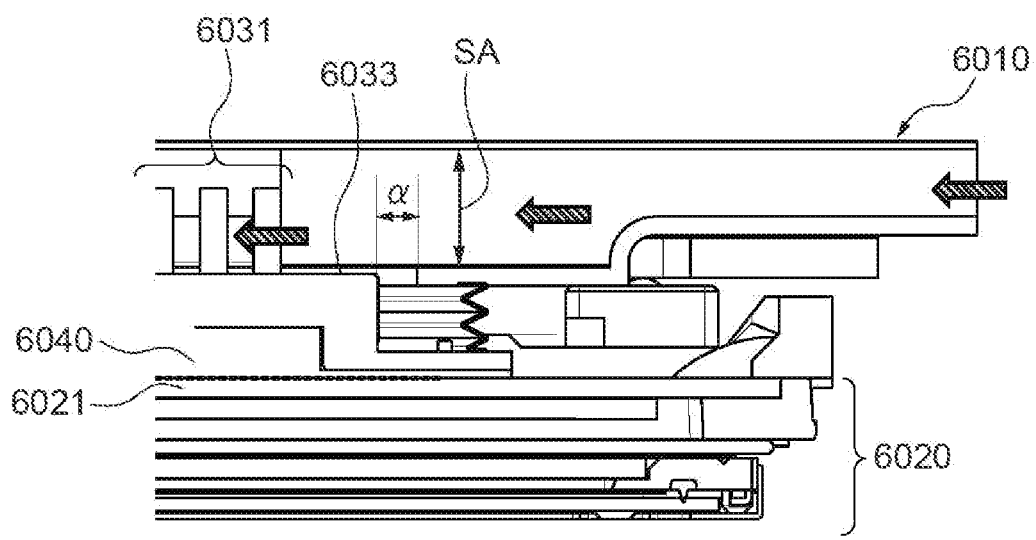
FIG. 28 is a cross-sectional view taken along F-F in FIG. 27.

FIG. 26 is a perspective view showing the heat dissipation fins portion 6030. FIG. 27 is a view showing a positional relationship between the first duct 6010 and the heat dissipation fins portion 6030. FIG. 28 is a cross-sectional view taken along F-F in FIG. 27. As shown in FIG. 26, the heat dissipation fins portion 6030 includes an attachment portion 6032 which is brought into contact with a heat dissipation target and attached to it, and a protruding portion 6034 which protrudes from the attachment portion 6032 toward the first duct 6010. The protruding portion 6034 includes a plurality of fins 6031, and a base portion 6033 supporting the fins 6031. The fins 6031 of the protruding portion 6034 are positioned inside the first duct 6010, while the base portion 6033 of the same is disposed outside the first duct 6010.

The attachment portion 6032 is a disc shaped portion. The base portion 6033 is a column shaped portion formed concentrically with the attachment portion 6032. As shown in FIG. 27, the fins portion insertion hole 6013 is a circular hole larger than the diameter of the base portion 6033, and a clearance a is provided between an outer peripheral portion of the base portion 6033 and an inner peripheral portion of the fins portion insertion hole 6013. With this, the fins 6031 (protruding portion 6034) are maintained in a state not brought into contact with the first duct 6010 regardless of the driving state of the image sensor unit 6020. This makes it possible to prevent the fins 6031 from blocking the driving of the image sensor unit 6020.

As mentioned above, the base portion 6033 is disposed outside the first duct 6010. With this arrangement, as shown in FIG. 28, it is possible to prevent, in the first duct 6010, air resistance from being caused by the base portion 6033. Further, the fins 6031 are positioned inside the first duct 6010. With this, in the first duct 6010, air can be brought into contact with the fins 6031, and therefore, it is possible to quickly dissipate heat having reached the fins 6031. This makes it possible to efficiently cool the image sensor unit 6020. As shown in FIG. 28, a portion of the first duct 6010 where the heat dissipation member 5777 is connected is made larger in the cross-sectional area SA of the air flow passage than upstream and downstream portions. This makes it possible to cancel air resistance generated by the fins 6031, which contributes to smooth passing of air. Further, as shown in FIG. 27, two rib-shaped portions 6015 are provided inside the first duct base 6011. A spacing β between the two rib-shaped portions 6015 is equal to the diameter of the fins portion insertion hole 6013. With this, it is possible to guide air to the fins 6031 of the heat dissipation fins portion 6030, which makes it possible to efficiently cool the image sensor unit 6020.

A fourth embodiment will be described below with reference to FIGS. 29A to 32C, but the description will be mainly given of different points from the above-described first to third embodiments, and description of the same points is omitted.

Figure 29A:
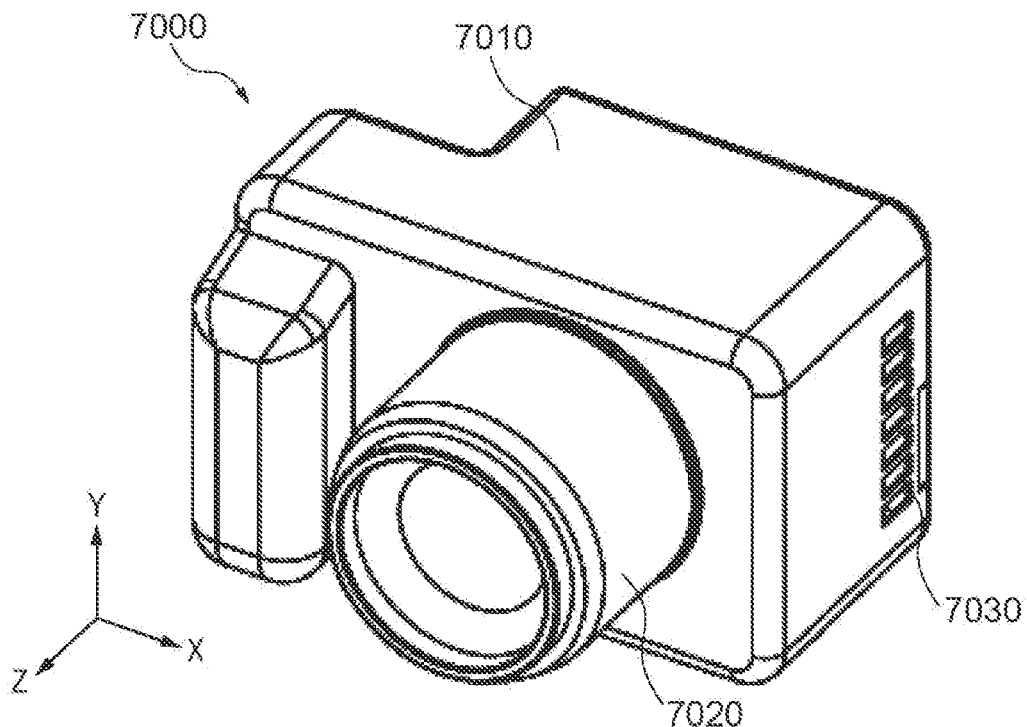
FIG. 29A is a perspective view of an image capturing apparatus according to a fourth embodiment, as viewed from the front.
Figure 29B:
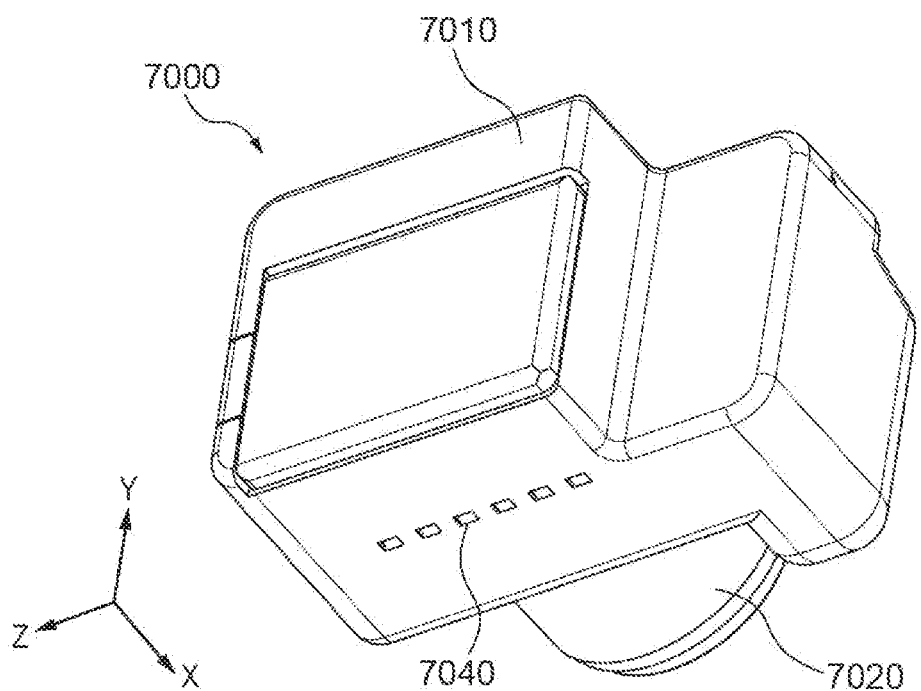
FIG. 29B is a perspective view of the image capturing apparatus, as viewed from the rear.

FIG. 29A is a perspective view of an image capturing apparatus 7000, as viewed from the front. FIG. 29B is a perspective view of the image capturing apparatus 7000, as viewed from the rear. As shown in FIGS. 29A and 29B, the image capturing apparatus 7000 includes an image capturing apparatus body 7010 and a lens barrel 7020. As shown in FIG. 29A, a plurality of air outlet ports 7030 are provided to open in a right side (in the +X direction) of the image capturing apparatus body 7010, as viewed from the object side. The air outlet ports 7030 are formed to discharge air to the outside of the image capturing apparatus body 7010 in accordance with the operation of a cooling fan 7160, described hereinafter. As shown in FIG. 29B, a plurality of first air inlet ports 7040 are provided to open in a bottom side of the image capturing apparatus body 7010 (in the −Y direction). The first air inlet ports 7040 are formed to suction air into the inside of the image capturing apparatus body 7010 in accordance with the operation of the cooling fan 7160.

Figure 30A:
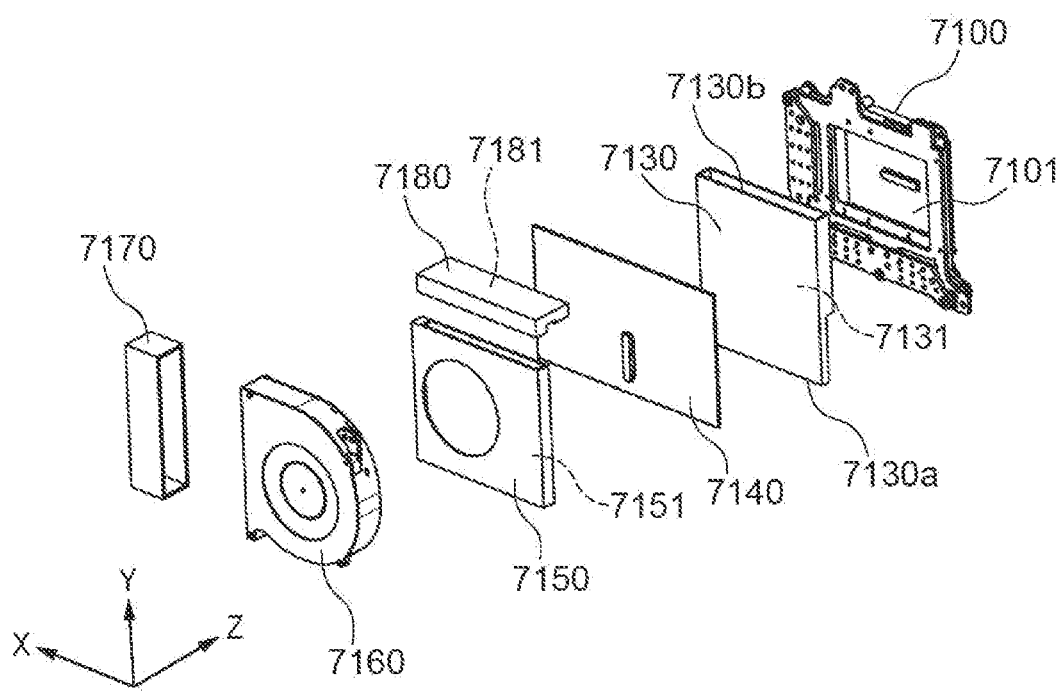
FIG. 30A is an exploded perspective view of internal components of the image capturing apparatus, as viewed from the rear.
Figure 30B:
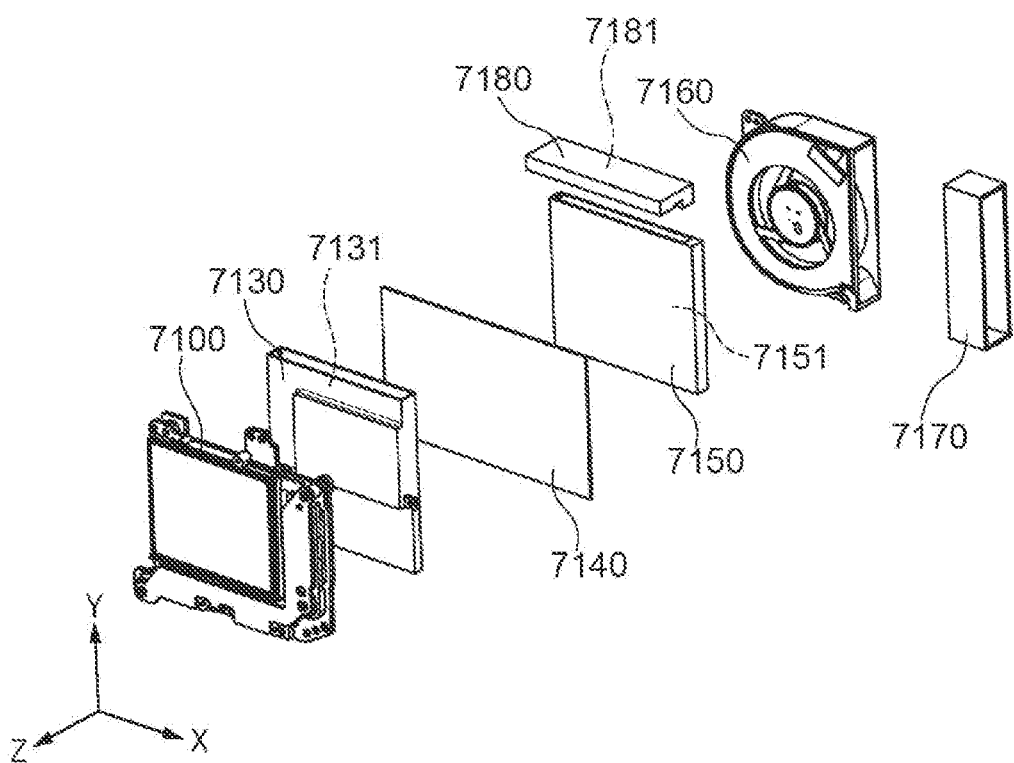
FIG. 30B is an exploded perspective view of the internal components of the image capturing apparatus, as viewed from the front.

Internal components of the image capturing apparatus 7000 will be briefly described. FIG. 30A is an exploded perspective view of the internal components of the image capturing apparatus 7000, as viewed from the rear. FIG. 30B is an exploded perspective view of the internal components of the image capturing apparatus 7000, as viewed from the front. As shown in FIGS. 30A and 30B, the internal components of the image capturing apparatus 7000 include an image sensor unit 7100, a first duct 7130, a control circuit board 7140, a second duct 7150, the cooling fan 7160, an air outlet port connection section 7170, and a duct connection section 7180.

Similar to the first embodiment, the image stabilization function is exhibited for the image sensor unit 7100. The first duct 7130 is a cooling duct that is disposed between the image sensor unit 7100 and the control circuit board 7140 and can cool both of the image sensor unit 7100 and the control circuit board 7140. Since it is possible to collectively cool the image sensor unit 7100 and the control circuit board 7140 using the one first duct 7130 as mentioned above, it is possible to make the internal configuration of the image capturing apparatus 7000 simple. This makes it possible to achieve size reduction of the image capturing apparatus 7000. The first duct 7130 has a first air flow passage 7131 positioned between an image sensor board 7101 and the control circuit board 7140. A first duct air inlet portion 7130a of the first air flow passage 7131 is connected to the above-mentioned first air inlet ports 7040. A first duct air discharge portion 7130b of the first air flow passage 7131 is connected to the duct connection section 7180. The second duct 7150 has a second air flow passage 7151 positioned between the control circuit board 7140 and the cooling fan 7160. The duct connection section 7180 has a third air flow passage 7181 connecting between the first air flow passage 7131 and the second air flow passage 7151. A closed space is formed from the first air inlet ports 7040 to the air outlet ports 7030 by the first air flow passage 7131, the third air flow passage 7181, and the second air flow passage 7151. The cooling fan 7160 is a centrifugal fan. Air is suctioned from the first air inlet ports 7040 in accordance with the operation of the cooling fan 7160, and the suctioned air sequentially flows through the first air flow passage 7131, the third air flow passage 7181, and the second air flow passage 7151, and is discharged from the air outlet ports 7030. Further, the duct connection section 7180 (third air flow passage 7181) is disposed at a location not overlapping the image sensor board 7101 and the control circuit board 7140, as viewed from the Z-axis direction. With this, it is possible to effectively use part of a space around the image sensor unit 7100, as viewed from the Z-axis direction, as a space for disposing the duct connection section 7180, which contributes to size reduction of the image capturing apparatus 7000.

Figure 31A:
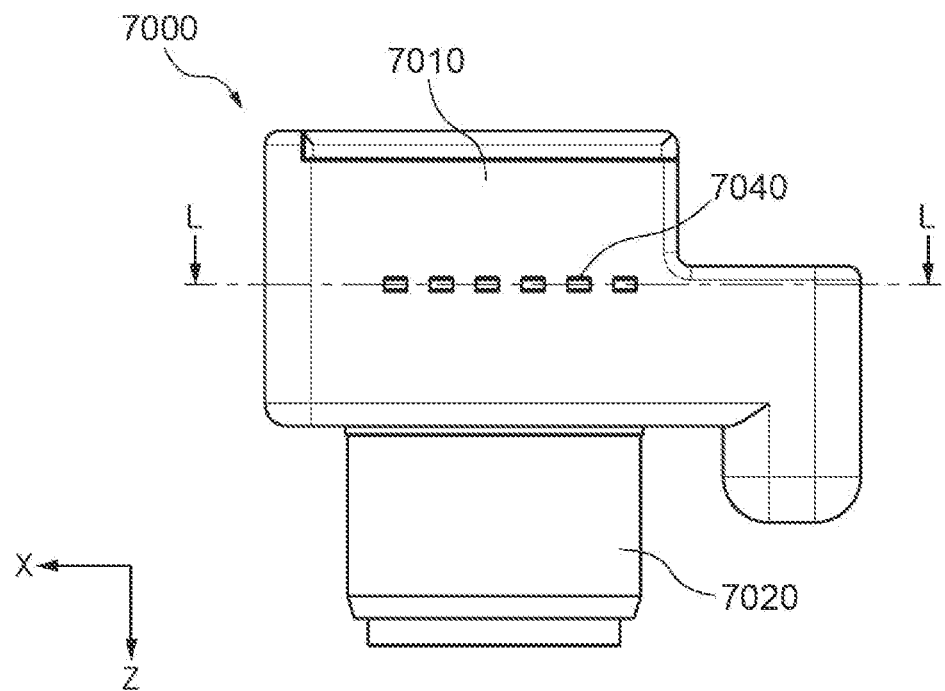
FIG. 31A is a bottom view of the image capturing apparatus.
Figure 31B:
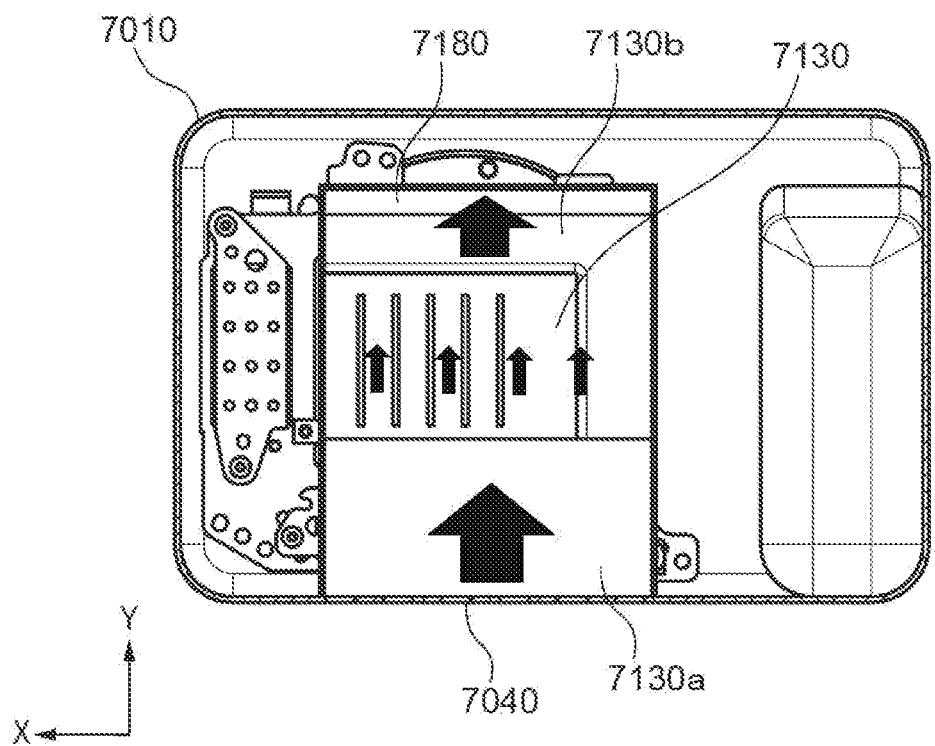
FIG. 31B is a cross-sectional view taken along L-L in FIG. 31A.
Figure 32A:
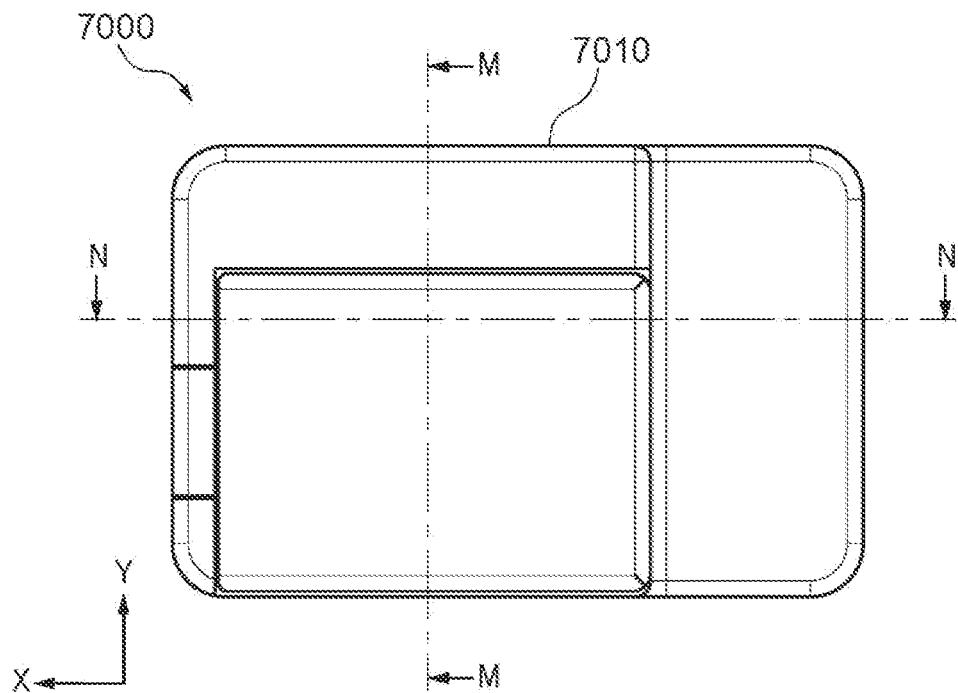
FIG. 32A is a rear view of the image capturing apparatus.
Figure 32B:
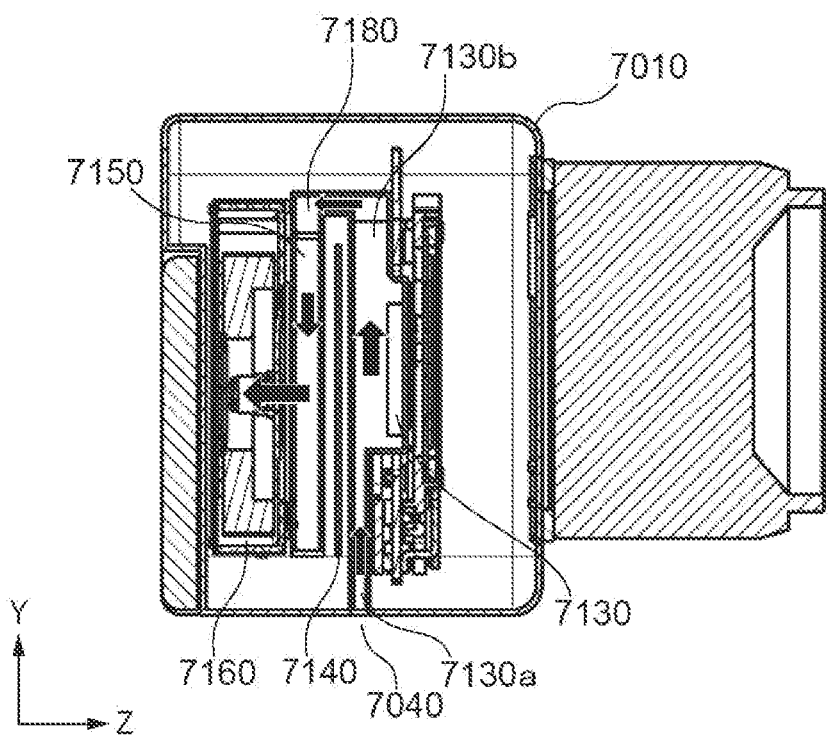
FIG. 32B is a cross-sectional view taken along M-M in FIG. 32A.
Figure 32C:
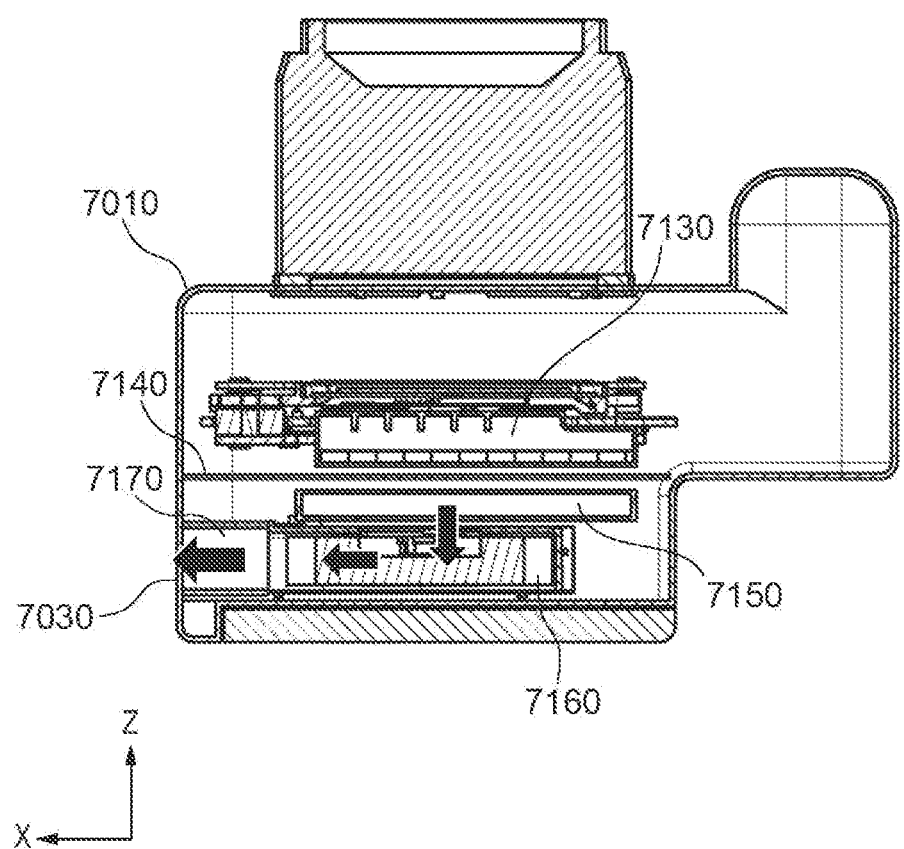
FIG. 32C is a cross-sectional view taken along N-N in FIG. 32A.

The heat dissipation structure of the image capturing apparatus 7000 will be described. FIG. 31A is a bottom view of the image capturing apparatus 7000. FIG. 31B is a cross-sectional view taken along L-L in FIG. 31A. FIG. 32A is a rear view of the image capturing apparatus 7000. FIG. 32B is a cross-sectional view taken along M-M in FIG. 32A. FIG. 32C is a cross-sectional view taken along N-N in FIG. 32A.

Heat generated in the image sensor board 7101 of the image sensor unit 7100 is transferred to the first duct 7130. Heat transfer from the image sensor board 7101 to the first duct 7130 is the same as that in the first embodiment. Further, heat generated in the control circuit board 7140 is transferred to the first duct 7130 and the second duct 7150, described above. Outside air suctioned from the first air inlet ports 7040 by the colling fan 7160 enters the image capturing apparatus 7000, as shown in FIG. 31B, and then passes through the first duct 7130. Then, as the air passes through the first duct 7130, heat exchange is performed between the image sensor board 7101 and the control circuit board 7140, and the first duct 7130. The air increased in temperature by heat exchange sequentially passes the duct connection section 7180 and the second duct 7150 and is then drawn in by the cooling fan 7160, as shown in FIG. 32B. Then, as shown in FIG. 32C, the air is discharged to the outside from the air outlet ports 7030 via the air outlet port connection section 7170.

In the heat dissipation structure of the present embodiment, the first air inlet ports 7040 and the first duct air inlet portion 7130a are widely opened in the X-axis direction along the control circuit board 7140. The first duct 7130 has the first air flow passage extending straight in the Y-axis direction from the first duct air inlet portion 7130a to the first duct air discharge portion 7130b. Further, the first duct 7130 is formed into a shape having a wide heat transfer range on a projected shadow of the control circuit board 7140 in the Z-axis direction. With this arrangement, it is possible to efficiently dissipate heat from the control circuit board 7140. The first duct 7130 is disposed such that it is also opposed to the image sensor board 7101 of the image sensor unit 7100. With this, it is also possible to efficiently dissipate heat from the image sensor unit 7100. As described above, in the present embodiment, the first duct 7130 can efficiently dissipate heat from the control circuit board 7140 and the image sensor unit 7100, using a limited space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075153 filed Apr. 28, 2022, which is hereby incorporated by reference herein in its entirety.

What is claimed is:

1. An image capturing apparatus comprising:
an image sensor unit that includes an image sensor board on which an image sensor is mounted;
a first drive mechanism that drives the image sensor unit in a first direction orthogonal to an optical axis of the image sensor;
a second drive mechanism that drives the image sensor unit in a second direction which is orthogonal to the optical axis and different from the first direction;
a unit cooling duct disposed on an opposite side of the image sensor board to a surface on which the image sensor is mounted, such that the unit cooling duct is opposed to the image sensor board, so as to allow air for cooling the image sensor unit to pass therethrough; and
a heat conduction member that is connected to the image sensor unit and the unit cooling duct, and transfers heat from the image sensor unit to the unit cooling duct,
wherein the unit cooling duct has an air suction port for suctioning the air and an air discharge port for discharging the air,
wherein when viewed from the optical axis direction, the first drive mechanism, the second drive mechanism, the air suction port, and the air discharge port are in a positional relation not overlapping one another around the image sensor, and
wherein the heat conduction member is a flexible heat conduction member that is extendable/contractable.

2. The image capturing apparatus according to claim 1, wherein the first drive mechanism and the air suction port are arranged across the optical axis, and
wherein the second drive mechanism and the air discharge port are arranged across the optical axis.

3. The image capturing apparatus according to claim 1, wherein the image sensor is formed into a rectangle, as viewed from the optical axis direction,
wherein the first drive mechanism and the second drive mechanism are arranged on two sides of the rectangle, adjacent to each other, respectively, and
wherein the air suction port and the air discharge port are arranged on the remaining two sides of the rectangle, which are adjacent to each other and different from the aforementioned two sides, respectively.

4. The image capturing apparatus according to claim 1, wherein the first drive mechanism, the second drive mechanism, and the unit cooling duct are the same in thickness along the optical axis direction.

5. The image capturing apparatus according to claim 1, wherein, between the image sensor unit and the unit cooling duct, a first clearance is formed in a direction in which the image sensor unit is driven by the first drive mechanism, and a second clearance is formed in a direction in which the image sensor unit is driven by the second drive mechanism, and
wherein the first clearance is larger than a driving distance of the image sensor unit over which the image sensor unit is driven by the first drive mechanism, and the second clearance is larger than a driving distance of the image sensor unit over which the image sensor unit is driven by the second drive mechanism.

6. The image capturing apparatus according to claim 1, further comprising a support member for supporting the image sensor unit such that the image sensor unit is movable in the first direction and the second direction, and
wherein the unit cooling duct is fixed to the support member.

7. The image capturing apparatus according to claim 1, wherein the image sensor unit includes a sensor holding member for holding the image sensor board.

8. The image capturing apparatus according to claim 1, further comprising a fan that forces the air to pass through the unit cooling duct.

9. The image capturing apparatus according to claim 1, further comprising:
a control circuit board that is disposed on an opposite side of the unit cooling duct to the image sensor unit, and controls operations of at least the first drive mechanism and the second drive mechanism,
a circuit board cooling duct disposed on an opposite side of the control circuit board to the image sensor unit, so as to allow air for cooling the control circuit board to pass therethrough, and
a connection duct that connects between the unit cooling duct and the circuit board cooling duct.

10. The image capturing apparatus according to claim 9, wherein the connection duct is disposed at a location not overlapping the image sensor unit, when viewed from the optical axis direction.

11. The image capturing apparatus according to claim 9, further comprising:
an electrical connection portion that electrically connects between the image sensor board and the control circuit board,
a reinforcing portion that reinforces the electrical connection portion,
a heat conduction sheet that is disposed in a state positioned side by side to the electrical connection portion and has heat conductivity,
a heat conduction member that transfers heat from the image sensor board and has elasticity, and
wherein when viewed from the optical axis direction, the heat conduction sheet and the heat conduction member at least partially overlap the reinforcing portion.

12. The image capturing apparatus according to claim 11, wherein the electrical connection portion has flexibility and is disposed in a bent state.

13. The image capturing apparatus according to claim 11, wherein the heat conduction member is disposed in a compressed state, and
wherein a reaction force generated by the heat conduction member is slammer than a connection force for maintaining connection between the electrical connection portion and the image sensor board.

14. The image capturing apparatus according to claim 1, wherein the flexible heat conduction member is formed into a spiral shape, and one of its central portion and an outer peripheral portion positioned on an outer peripheral side of the central portion is connected to the image sensor unit, and the other is connected to the unit cooling duct.

15. The image capturing apparatus according to claim 1, wherein the flexible heat conduction member includes a first bellows portion which is extendable/contractable and has a bellows shape, and a second bellows portion which is extendable/contractable in a direction different from a direction in which the first bellows portion is extendable/contractable and has a bellows shape, and an end toward one of the first bellows portion and the second bellows portion is connected to the image sensor unit, and an end toward the other of the first bellows portion and the second bellows portion is connected to the unit cooling duct.

16. The image capturing apparatus according to claim 15, wherein a direction in which the first bellows portion extends/contracts and a direction in which the second bellows portion extends/contracts are orthogonal to each other, and wherein the flexible heat conduction member includes a connection portion that connects between the first bellows portion and the second bellows portion, and the connection portion is lower in stretchability than the first bellows portion and the second bellows portion.

17. A image capturing apparatus comprising:
an image sensor unit that includes an image sensor board on which an image sensor is mounted;
a first drive mechanism that drives the image sensor unit in a first direction orthogonal to an optical axis of the image sensor;
a second drive mechanism that drives the image sensor unit in a second direction which is orthogonal to the optical axis and different from the first direction;
a unit cooling duct disposed on an opposite side of the image sensor board to a surface on which the image sensor is mounted, such that the unit cooling duct is opposed to the image sensor board, so as to allow air for cooling the image sensor unit to pass therethrough; and
a heat conduction member that is connected to the image sensor unit and the unit cooling duct, and transfers heat from the image sensor unit to the unit cooling duct,
wherein the unit cooling duct has an air suction port for suctioning the air and an air discharge port for discharging the air,
wherein when viewed from the optical axis direction, the first drive mechanism, the second drive mechanism, the air suction port, and the air discharge port are in a positional relation not overlapping one another around the image sensor,
wherein the heat conduction member is a heat conduction sheet, and
wherein at least part of the heat conduction sheet toward the unit cooling duct is formed by a superposed part formed by superposing a plurality of belt-shaped portions each formed into a belt shape.

18. The image capturing apparatus according to claim 17, wherein the superposed part is formed by the plurality of belt-shaped portions in a superposed state, each of which is formed by folding a single sheet member.

19. The image capturing apparatus according to claim 17, wherein the belt- shaped portions are sheet members each having a belt shape and independent of each other, and
wherein the superposed part is formed by the plurality of sheet members in a superposed state.

20. An image capturing apparatus comprising:
an image sensor unit that includes an image sensor board on which an image sensor is mounted;
a first drive mechanism that drives the image sensor unit in a first direction orthogonal to an optical axis of the image sensor;
a second drive mechanism that drives the image sensor unit in a second direction which is orthogonal to the optical axis and different from the first direction;
a heat dissipation section that dissipates heat from the image sensor board;
a unit cooling duct disposed on an opposite side of the image sensor board to a surface on which the image sensor is mounted, such that the unit cooling duct is opposed to the image sensor board, so as to allow air for cooling the image sensor unit to pass therethrough; and a hollow member that connects between the heat dissipation section and the unit cooling duct and communicates with the unit cooling duct,
wherein the unit cooling duct has an air suction port for suctioning the air and an air discharge port for discharging the air, and
wherein when viewed from the optical axis direction, the first drive mechanism, the second drive mechanism, the air suction port, and the air discharge port are in a positional relation not overlapping one another around the image sensor.

21. The image capturing apparatus according to claim 20, wherein the hollow member is extendable/contractable.

22. The image capturing apparatus according to claim 20, wherein the hollow member has heat conductivity.

23. The image capturing apparatus according to claim 20, wherein the heat dissipation section has a protruding portion that protrudes toward the unit cooling duct, and
wherein the protruding portion is inserted into the unit cooling duct via the hollow member.

24. The image capturing apparatus according to claim 23, wherein the protruding portion is maintained in a non-contact state with the unit cooling duct regardless of a driving state of the image sensor unit.

25. The image capturing apparatus according to claim 23, wherein the protruding portion has a plurality of fins and a base portion for supporting the fins.

26. The image capturing apparatus according to claim 20, wherein a portion of the unit cooling duct where the hollow member is connected is made larger in cross-sectional area of an air flow passage through which the air passes.

27. An image capturing apparatus comprising:
an image sensor unit that includes an image sensor board on which an image sensor is mounted;
a first drive mechanism that drives the image sensor unit in a first direction orthogonal to an optical axis of the image sensor;
a second drive mechanism that drives the image sensor unit in a second direction which is orthogonal to the optical axis and is different from the first direction;
a control circuit board that controls operations of at least the first drive mechanism and the second drive mechanism;
a cooling duct through which air for cooling at least one of the image sensor unit and the control circuit board passes; and
a fan that forces the air to pass through the cooling duct,
wherein the cooling duct has a first air flow passage positioned between the image sensor board and the control circuit board, a second air flow passage positioned between the control circuit board and the fan, and a third air flow passage that connects between the first air flow passage and the second air flow passage.

28. The image capturing apparatus according to claim 27, wherein the image sensor unit, the control circuit board, and the fan are disposed along the optical axis direction in order, and
wherein when viewed from the optical axis direction, the third air flow passage is disposed at a location not overlapping the image sensor board and the control circuit board.

29. The image capturing apparatus according to claim 27, wherein the cooling duct can cool both of the image sensor unit and the control circuit board.

* * * * *